United States Patent
Jiao et al.

(10) Patent No.: US 11,088,805 B2
(45) Date of Patent: Aug. 10, 2021

(54) CONTROL INFORMATION TRANSMISSION METHOD, TERMINAL DEVICE, AND NETWORK DEVICE

(71) Applicant: Huawei Technologies Co., Ltd., Shenzhen (CN)

(72) Inventors: Shurong Jiao, Shanghai (CN); Jinlin Peng, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 16/712,524

(22) Filed: Dec. 12, 2019

(65) Prior Publication Data

US 2020/0127790 A1    Apr. 23, 2020

Related U.S. Application Data

(63) Continuation of application No. PCT/CN2018/091346, filed on Jun. 14, 2018.

(30) Foreign Application Priority Data

Jun. 16, 2017 (CN) .......................... 201710459113.1

(51) Int. Cl.
*H04L 5/00* (2006.01)
*H04W 72/04* (2009.01)

(52) U.S. Cl.
CPC .......... *H04L 5/0053* (2013.01); *H04L 5/0007* (2013.01); *H04L 5/0044* (2013.01); *H04W 72/042* (2013.01)

(58) Field of Classification Search
CPC ... H04L 5/0044; H04L 5/0007; H04L 5/0092; H04L 5/0053; H04W 48/12; H04W 72/042; H04W 72/04
See application file for complete search history.

(56) References Cited

U.S. PATENT DOCUMENTS

| 2016/0044644 | A1  | 2/2016 | Lyu et al. |
| 2018/0092070 | A1* | 3/2018 | Liao ..................... H04L 5/0094 |

(Continued)

FOREIGN PATENT DOCUMENTS

| CN | 101801093 A | 8/2010 |
| CN | 101877621 A | 11/2010 |

(Continued)

OTHER PUBLICATIONS

Ericsson, "Summary of e-mail discussions on downlink control signaling," 3GPP TSG-RAN WG1 #87; R1-1612908, Reno, USA, Nov. 14-18, 2016, 58 pages.

(Continued)

*Primary Examiner* — Maharishi V Khirodhar
*Assistant Examiner* — Kenneth P Hunt
(74) *Attorney, Agent, or Firm* — Slater Matsil, LLP

(57) ABSTRACT

This application provides a control information transmission method, a terminal device, and a network device. The method includes: determining, by a terminal device, a bit length of downlink control information DCI based on a location of a target first time unit in a second time unit, where the DCI includes time domain resource location information, the time domain resource location information is used to indicate at least one of time domain length information of a third time unit and time domain start location information for data transmission scheduled based on the DCI, the DCI is carried in the target first time unit, and a time domain length of the third time unit is less than or equal to a time domain length of the second time unit; and receiving, by the terminal device, the DCI from a network device.

20 Claims, 7 Drawing Sheets

(56) References Cited

U.S. PATENT DOCUMENTS

| | | | |
|---|---|---|---|
| 2019/0158251 A1* | 5/2019 | Park | ............... H04L 5/0055 |
| 2019/0223209 A1* | 7/2019 | Li | ...................... H04L 5/00 |
| 2020/0389894 A1* | 12/2020 | Pan | ............ H04W 72/0446 |

FOREIGN PATENT DOCUMENTS

| | | |
|---|---|---|
| CN | 105379144 A | 3/2016 |
| CN | 106455103 A | 2/2017 |
| WO | 2014058223 A2 | 4/2014 |

OTHER PUBLICATIONS

Huawei, "Email discussion [86b-23] on multi-steps DL control channel design," 3GPP TSG RAN WG1 Meeting #87, R1-1611656, Reno, USA, Nov. 14-18, 2016, 13 pages.

LG Electronics, "Discussion on DCI design," 3GPP TSG RAN WG1 Meeting #88, R1-1702581, Athens, Greece, Feb. 13-17, 2017, 5 pages.

Huawei et al., "DCI contents in NR and two-stage DCI designs," 3GPP TSG RAN WG1 Meeting #89, R1-1706949, Hangzhou, China, May 15-19, 2017, 6 pages.

LG Electronics, "Discussion on DCI contents," 3GPP TSG RAN WG1 Meeting #89, R1-1707632, Hangzhou, P.R. China, May 15-19, 2017, 3 pages.

Ericsson, "On Downlink Control Information Design," 3GPP TSG-RAN WG1 Meeting#89, R1-1709073, Hangzhou, China, May 15-19, 2017, 4 pages.

3rd Generation Partnership Project; Technical Specification Group Radio Access Network; NR;Multiplexing and channel coding (Release 15), 3GPP TS 38.212 V0.0.0 (May 2017), 10 pages.

3rd Generation Partnership Project; Technical Specification Group Radio Access Network; NR;Radio Resource Control (RRC); Protocol specification (Release 15 ), 3GPP TS 38.331 V0.0.3 (May 2017), 20 pages.

* cited by examiner

CONTROL INFORMATION TRANSMISSION METHOD, TERMINAL DEVICE, AND NETWORK DEVICE

CROSS-REFERENCE TO RELATED APPLICATIONS

This application is a continuation of International Application No. PCT/CN2018/091346, filed on Jun. 14, 2018, which claims priority to Chinese Patent Application No. 201710459113.1, filed on Jun. 16, 2017. The disclosures of the aforementioned applications are hereby incorporated by reference in their entireties.

TECHNICAL FIELD

This application relates to the communications field, and more specifically, to a control information transmission method, a terminal device, and a network device.

BACKGROUND

To cope with explosive growth of mobile data traffic, massive mobile communications device connections, constantly emerging various new services and application scenarios in the future, 5th generation (5G) mobile communications system emerges. The international telecommunication union (ITU) defines three application scenarios for 5G and future mobile communications systems: enhanced mobile broadband (eMBB), ultra-reliable and low latency communications (URLLC), and massive machine type communications (mMTC). A URLLC service has extremely high requirements on a latency. Without considering reliability, a transmission latency is required to be within 0.5 milliseconds (ms); and on the premise that 99.999% reliability is reached, a transmission latency is required to be within 1 ms.

In a long term evolution (LTE) system, a minimum time scheduling unit is a transmission time interval (TTI) of a 1 ms time length. To meet the transmission latency requirements of the URLLC service, a shorter time scheduling unit may be used for data transmission at a wireless air interface. For example, a mini-slot or a slot with a greater subcarrier spacing is used as a minimum time scheduling unit. One mini-slot includes one or more time domain symbols, and the time domain symbol herein may be an orthogonal frequency division multiplexing (OFDM) symbol. For a slot with a subcarrier spacing of 15 kilohertz (kHz), six or seven time domain symbols are included, and a corresponding time length is 0.5 ms; and for a slot with a subcarrier spacing of 60 kHz, a corresponding time length is shortened to 0.125 ms. Currently, control information may include related information of a time domain start location of a data symbol in a mini-slot and a quantity of data symbols in the mini-slot. However, a method for "indicating a location of a data symbol in a mini-slot by control information" in a current technology is apt to cause bit length redundancy of downlink control information, reducing control information transmission efficiency at an air interface. Therefore, a new method needs to be provided urgently to resolve the foregoing problem.

SUMMARY

This application provides a control information transmission method, a terminal device, and a network device, helping to reduce bit redundancy of downlink control information DCI, preventing a terminal device from performing blind detection on downlink control information of different bit lengths, and reducing complexity of a receiver.

According to a first aspect, a control information transmission method is provided. The method includes: determining, by a terminal device, a bit length of downlink control information (DCI) based on a location of a target first time unit in a second time unit, where the DCI includes time domain resource location information, the time domain resource location information is used to indicate at least one of time domain length information of a third time unit and time domain start location information for data transmission scheduled based on the DCI, the DCI is carried in the target first time unit, and a time domain length of the third time unit is less than or equal to a time domain length of the second time unit; and receiving, by the terminal device, the DCI from a network device.

In this embodiment of this application, the terminal device determines the bit length of the downlink control information (DCI) based on the location of the target first time unit in the second time unit, where the DCI includes the time domain resource location information, and the time domain resource location information is used to indicate the at least one of the time domain length information of the third time unit and the time domain start location information for the data transmission scheduled based on the DCI; receives, in the target first time unit, the DCI from the network device; and demodulates and decodes the DCI based on the bit length of the DCI. This can prevent the terminal device from performing blind detection on DCI of different bit lengths, reducing complexity of a receiver.

In this embodiment of this application, the bit length of the DCI is a payload size of the DCI.

Optionally, the time domain length information of the third time unit is used to indicate a quantity of first time units included in the third time unit.

Optionally, a first time unit, the second time unit, and the third time unit are concepts of different time granularities. For example, the second time unit is a slot, the third time unit is a mini-slot, and the first time unit is a time domain symbol (for example, an OFDM symbol). Herein, the time domain length of the third time unit may be less than or equal to the time domain length of the second time unit, the third time unit may include one or more first time units, and the second time unit includes one or more first time units.

Optionally, the time domain length information of the third time unit is used to indicate the quantity of the first time units included in the third time unit.

In this embodiment of this application, the first time unit included in the third time unit may include the first time unit in which the DCI is located, or may not include the first time unit in which the DCI is located.

Optionally, the time domain start location information may indicate an absolute start location, for example, the time domain start location information indicates the first time unit; or may indicate a relative start location, for example, the time domain start location information indicates a start location relative to the first time unit in which the DCI is located.

In this embodiment of this application, the first time unit included in the third time unit may include the first time unit in which the DCI is located, or may not include the first time unit in which the DCI is located. In addition, if the third time unit includes the first time unit in which the DCI is located, the first time unit configured to transmit the DCI and a first time unit configured to transmit data may be consecutive in time, or may be inconsecutive in time. This is not limited. Further, the first time unit carrying the DCI may carry or not carry the data.

Optionally, the time domain resource location information may be used to indicate the at least one of the time domain length information of the third time unit and the time domain start location information for the data transmission scheduled based on the DCI. For example, the time domain resource location information may be used to indicate the time domain start location information for the data transmission scheduled based on the DCI; or for another example, the time domain resource location information may be used to indicate the time domain length information of the third time unit; or for still another example, the time domain resource location information may be used to indicate not only the time domain start location information for the data transmission scheduled based on the DCI, but also the time domain length information of the third time unit for the data transmission scheduled based on the DCI.

In some possible implementations, the determining, by a terminal device, a bit length of DCI based on a location of a target first time unit in a second time unit includes: determining, by the terminal device, a bit length of the time domain resource location information in the DCI based on the location of the target first time unit in the second time unit and a first mapping relationship, where the first mapping relationship is used to indicate a correspondence between an index of the location of the target first time unit in the second time unit and the bit length of the time domain resource location information in the DCI; and determining, by the terminal device, the bit length of the DCI based on the bit length of the time domain resource location information in the DCI.

Herein, the first mapping relationship may be used to indicate the correspondence between the index (for example, a symbol number or index) of the location of the target first time unit in the second time unit and the bit length of the time domain resource location information in the DCI. The first mapping relationship may include a plurality of correspondences. Each correspondence is a correspondence between an index of a location of each first time unit in the second time unit and a bit length of time domain resource location information in DCI.

Optionally, the first mapping relationship may be implemented by using an index table or a logic judgment statement, and an implementation mode is relatively flexible.

Therefore, the terminal device determines, based on the location of the target first time unit in the second time unit and the first mapping relationship, the bit length of the time domain resource location information that adapts to the DCI. This ensures that a bit length of DCI in each time unit is a single fixed value, and also ensures that the bit length of the DCI in each time unit is a size adapting to a current requirement of the DCI. Therefore, this can avoid blind detection on the DCI of different bit lengths, reducing complexity of the receiver of the terminal device; and can also reduce bit redundancy, improving DCI transmission efficiency at an air interface.

In some possible implementations, the DCI further includes frequency domain resource location information, and the method further includes: determining, by the terminal device, a bit length of the frequency domain resource location information in the DCI based on the location of the target first time unit in the second time unit, where the frequency domain resource location information is used to indicate a location of a frequency domain resource used for the data transmission scheduled based on the DCI.

Further, the terminal device may determine the bit length of the DCI based on the bit length of the frequency domain resource location information in the DCI.

In this embodiment of this application, the terminal device may determine, based on the location of the target first time unit in the second time unit, the bit length of the frequency domain resource location information that adapts to the DCI. This ensures that the bit length of the DCI in each time unit is a single fixed value, and also ensures that a payload size of the DCI in each time unit is a size adapting to a current requirement of the DCI. Therefore, this can avoid blind detection on DCI of different sizes, reducing complexity of the receiver of the terminal device; and can also reduce a quantity of bits in the DCI, improving DCI transmission efficiency at an air interface.

In some possible implementations, the determining, by the terminal device, a bit length of the frequency domain resource location information in the DCI based on the location of the target first time unit in the second time unit includes: determining, by the terminal device, the bit length of the frequency domain resource location information in the DCI based on the location of the target first time unit in the second time unit and a second mapping relationship, where the second mapping relationship is used to indicate a correspondence between the index of the location of the target first time unit in the second time unit and the bit length of the frequency domain resource location information in the DCI.

Herein, the second mapping relationship may be used to indicate the correspondence between the index (for example, a number) of the location of the target first time unit in the second time unit and the bit length of the frequency domain resource location information in the DCI. The second mapping relationship may include a plurality of correspondences. Each correspondence is a correspondence between the index of the location of each first time unit in the second time unit and a bit length of frequency domain resource location information in DCI.

Optionally, the second mapping relationship may be implemented by using an index table or a logic judgment statement, and an implementation mode is relatively flexible.

Therefore, the terminal device may determine the bit length of the frequency domain resource location information in the DCI based on the location of the target first time unit in the second time unit and the second mapping relationship, thereby reducing the quantity of the bits in the DCI, and improving DCI transmission efficiency at an air interface.

According to a second aspect, a control information transmission method is provided. The method includes: determining, by a network device, a bit length of downlink control information (DCI) based on a location of a target first time unit in a second time unit, where the DCI includes time domain resource location information, the time domain resource location information is used to indicate at least one of time domain length information of a third time unit and time domain start location information for data transmission scheduled based on the DCI, the DCI is carried in the target first time unit, and a time domain length of the third time unit is less than or equal to a time domain length of the second time unit; scheduling, by the network device, a resource for data, and generating the DCI; and sending, by the network device, the DCI in the target first time unit, and sending the data on a time domain resource indicated by the time domain resource location information.

In this embodiment of this application, the network device determines the bit length of the downlink control information (DCI) based on the location of the target first time unit in the second time unit, where the DCI includes the time domain resource location information, and the time domain resource location information is used to indicate the at least one of the time domain length information of the third time unit and the time domain start location information for the data transmission scheduled based on the DCI; receives, in the target first time unit, the DCI from the network device; and sends the DCI to a terminal device, so that the terminal device demodulates and decodes the DCI based on the bit length of the DCI. This can prevent the terminal device from performing blind detection on DCI of different bit lengths, reducing complexity of a receiver.

In this embodiment of this application, the bit length of the DCI is a payload size of the DCI.

Optionally, the time domain length information of the third time unit is used to indicate a quantity of first time units included in the third time unit.

Optionally, a first time unit, the second time unit, and the third time unit are concepts of different time granularities. For example, the second time unit is a slot, the third time unit is a mini-slot, and the first time unit is a time domain symbol (for example, an OFDM symbol). Herein, the time domain length of the third time unit may be less than or equal to the time domain length of the second time unit, the third time unit may include one or more first time units, and the second time unit includes one or more first time units.

Optionally, the time domain length information of the third time unit is used to indicate the quantity of the first time units included in the third time unit.

In this embodiment of this application, the first time unit included in the third time unit may include the first time unit in which the DCI is located, or may not include the first time unit in which the DCI is located.

Optionally, the time domain start location information may indicate an absolute start location, for example, the time domain start location information indicates the first time unit; or may indicate a relative start location, for example, the time domain start location information indicates a start location relative to the first time unit in which the DCI is located.

In this embodiment of this application, the first time unit included in the third time unit may include the first time unit in which the DCI is located, or may not include the first time unit in which the DCI is located. In addition, if the third time unit includes the first time unit in which the DCI is located, the first time unit configured to transmit the DCI and a first time unit configured to transmit data may be consecutive in time, or may be inconsecutive in time. This is not limited. Further, the first time unit carrying the DCI may carry or not carry the data.

Optionally, the time domain resource location information may be used to indicate the at least one of the time domain length information of the third time unit and the time domain start location information for the data transmission scheduled based on the DCI. For example, the time domain resource location information may be used to indicate the time domain start location information for the data transmission scheduled based on the DCI; or for another example, the time domain resource location information may be used to indicate the time domain length information of the third time unit; or for still another example, the time domain resource location information may be used to indicate not only the time domain start location information for the data transmission scheduled based on the DCI, but also the time domain length information of the third time unit for the data transmission scheduled based on the DCI.

In some possible implementations, the determining, by a network device, a bit length of DCI based on a location of a target first time unit in a second time unit includes: determining, by the network device, a bit length of the time domain resource location information in the DCI based on the location of the target first time unit in the second time unit and a first mapping relationship, where the first mapping relationship is used to indicate a correspondence between an index of the location of the target first time unit in the second time unit and the bit length of the time domain resource location information in the DCI; and determining, by the network device, the bit length of the DCI based on the bit length of the time domain resource location information in the DCI.

Herein, the first mapping relationship may be used to indicate the correspondence between the index (for example, a symbol number or index) of the location of the target first time unit in the second time unit and the bit length of the time domain resource location information in the DCI. The first mapping relationship may include a plurality of correspondences. Each correspondence is a correspondence between an index of a location of each first time unit in the second time unit and a bit length of time domain resource location information in DCI.

Optionally, the first mapping relationship may be implemented by using an index table or a logic judgment statement, and an implementation mode is relatively flexible.

Therefore, the network device may determine the bit length of the time domain resource location information in the DCI based on the location of the target first time unit in the second time unit and the first mapping relationship, thereby determining the bit length of the DCI.

In some possible implementations, the DCI further includes frequency domain resource location information, and the method further includes: determining, by the network device, a bit length of the frequency domain resource location information in the DCI based on the location of the target first time unit in the second time unit, where the frequency domain resource location information is used to indicate a location of a frequency domain resource used for the data transmission scheduled based on the DCI.

Further, the network device may determine the bit length of the DCI based on the bit length of the frequency domain resource location information in the DCI.

In this embodiment of this application, the network device may determine, based on the location of the target first time unit in the second time unit, the bit length of the frequency domain resource location information that adapts to the DCI. This ensures that a bit length of DCI in each time unit is a single fixed value, and also ensures that a payload size of the DCI in each time unit is a size adapting to a current requirement of the DCI. Therefore, this can avoid blind detection on DCI of different sizes, reducing complexity of the receiver of the terminal device; and can also reduce a quantity of bits in the DCI, improving DCI transmission efficiency at an air interface.

In some possible implementations, the determining, by the network device, a bit length of the frequency domain resource location information in the DCI based on the location of the target first time unit in the second time unit includes: determining, by the network device, the bit length of the frequency domain resource location information in the DCI based on the location of the target first time unit in the second time unit and a second mapping relationship, where the second mapping relationship is used to indicate a correspondence between the index of the location of the target first time unit in the second time unit and the bit length of the frequency domain resource location information in the DCI.

Herein, the second mapping relationship may be used to indicate the correspondence between the index (for example, a number) of the location of the target first time unit in the second time unit and the bit length of the frequency domain resource location information in the DCI. The second mapping relationship may include a plurality of correspondences. Each correspondence is a correspondence between the index of the location of each first time unit in the second time unit and a bit length of frequency domain resource location information in DCI.

Optionally, the second mapping relationship may be implemented by using an index table or a logic judgment statement, and an implementation mode is relatively flexible.

Therefore, the network device determines the bit length of the frequency domain resource location information in the DCI based on the location of the target first time unit in the second time unit and the second mapping relationship, so that the network device can allocate a proper frequency domain resource, for example, a physical resource block PRB, to the terminal device; and obtains the corresponding bit length of the DCI, helping to reduce bit redundancy of the DCI.

According to a third aspect, a control information transmission method is provided. The method includes: determining, by a network device, a bit sequence value of time domain resource location information based on a time domain start location and a time domain length for data transmission, where the time domain resource location information is used to indicate a time domain resource for the data transmission; and sending, by the network device, downlink control information (DCI), where the DCI includes the time domain resource location information.

In this embodiment of this application, the network device may determine the bit sequence value of the time domain resource location information based on both the time domain start location and the time domain length for the data transmission. This can reduce a bit length of the DCI.

In some possible implementations, the determining, by a network device, a bit sequence value of time domain resource location information based on a time domain start location and a time domain length for data transmission includes: determining, by the network device, the bit sequence value of the time domain resource location information based on a code mapping relationship, and the time domain start location and the time domain length for the data transmission, where the code mapping relationship is used to indicate a correspondence between the bit sequence value of the time domain resource location information and the time domain start location and the time domain length for the data transmission.

Optionally, the code mapping relationship may be implemented by using an index table or a logic judgment statement, and an implementation mode is relatively flexible.

Therefore, the network device may determine the bit sequence value of the time domain resource location information based on the code mapping relationship, and the time domain start location and the time domain length for the data transmission, and then generate the DCI based on the obtained bit sequence value.

According to a fourth aspect, a control information transmission method is provided. The method includes: receiving, by a terminal device, downlink control information (DCI), where the DCI includes time domain resource location information, and the time domain resource location information is used to indicate a time domain resource for data transmission; and obtaining, by the terminal device, the time domain resource location information, and determining, based on the time domain resource location information, a time domain start location and a time domain length for the data transmission.

In this embodiment of this application, the terminal device obtains the time domain resource location information, and determines, based on the time domain resource location information, the time domain start location and the time domain length for the data transmission. The network device determines a bit sequence value of the time domain resource location information based on both the time domain start location and the time domain length for the data transmission. This can reduce a bit length of the DCI.

In some possible implementations, the determining, based on the time domain resource location information, a time domain start location and a time domain length for the data transmission includes: determining, by the terminal device based on the time domain resource location information and a code mapping relationship, the time domain start location and the time domain length for the data transmission, where the code mapping relationship is used to indicate a correspondence between a bit sequence value of the time domain resource location information and the time domain start location and the time domain length for the data transmission.

Optionally, the code mapping relationship may be implemented by using an index table or a logic judgment statement, and an implementation mode is relatively flexible.

Therefore, the terminal device may determine, based on the time domain resource location information and the code mapping relationship, the time domain start location and the time domain length for the data transmission, thereby transmitting data.

According to a fifth aspect, a control information transmission method is provided. The method includes: determining, by a terminal device, a bit length of frequency domain resource location information in downlink control information (DCI) based on a location of a target first time unit in a second time unit, where the frequency domain resource location information is used to indicate a location of a frequency domain resource used for data transmission scheduled based on the DCI.

Further, the terminal device may determine a bit length of the DCI based on the bit length of the frequency domain resource location information in the DCI.

In this embodiment of this application, the terminal device may determine, based on the location of the target first time unit in the second time unit, the bit length of the frequency domain resource location information that adapts to the DCI. This ensures that a bit length of DCI in each time unit is a single fixed value, and also ensures that a payload size of the DCI in each time unit is a size adapting to a current requirement of the DCI. Therefore, this can avoid blind detection on DCI of different sizes, reducing complexity of a receiver of the terminal device; and can also reduce a quantity of bits in the DCI, improving DCI transmission efficiency at an air interface.

Optionally, a first time unit and the second time unit are concepts of different time granularities. For example, the second time unit is a slot, and the first time unit is a time domain symbol (for example, an OFDM symbol). Herein, the second time unit includes one or more first time units.

In some possible implementations, the determining, by a terminal device, a bit length of frequency domain resource location information in the DCI based on a location of a target first time unit in a second time unit specifically includes: determining, by the terminal device, the bit length of the frequency domain resource location information in the DCI based on the location of the target first time unit in the second time unit and a second mapping relationship, where the second mapping relationship is used to indicate a correspondence between an index of the location of the target first time unit in the second time unit and the bit length of the frequency domain resource location information in the DCI.

Optionally, the second mapping relationship may be implemented by using an index table or a logic judgment statement, and an implementation mode is relatively flexible.

Therefore, the terminal device may determine the bit length of the frequency domain resource location information in the DCI based on the location of the target first time unit in the second time unit and the second mapping relationship.

According to a sixth aspect, a control information transmission method is provided. The method includes: determining, by a network device, a bit length of frequency domain resource location information in DCI based on a location of a target first time unit in a second time unit, where the frequency domain resource location information is used to indicate a location of a frequency domain resource used for data transmission scheduled based on the DCI.

Further, the network device may determine a bit length of the DCI based on the bit length of the frequency domain resource location information in the DCI.

In this embodiment of this application, the network device may determine, based on the location of the target first time unit in the second time unit, the bit length of the frequency domain resource location information that adapts to the DCI, so that the network device can allocate a proper frequency domain resource to a terminal device; and obtain the corresponding bit length of the DCI. This ensures that a bit length of DCI in each time unit is a single fixed value, and also ensures that a payload size of the DCI in each time unit is a size adapting to a current requirement of the DCI. Therefore, this can avoid blind detection on DCI of different sizes, reducing complexity of a receiver of the terminal device; and can also reduce a quantity of bits in the DCI, improving DCI transmission efficiency at an air interface.

In some possible implementations, the determining, by a network device, a bit length of frequency domain resource location information in DCI based on a location of a target first time unit in a second time unit specifically includes: determining, by the network device, the bit length of the frequency domain resource location information in the DCI based on the location of the target first time unit in the second time unit and a second mapping relationship, where the second mapping relationship is used to indicate a correspondence between an index of the location of the target first time unit in the second time unit and the bit length of the frequency domain resource location information in the DCI.

Optionally, a first time unit and the second time unit are concepts of different time granularities. For example, the second time unit is a slot, and the first time unit is a time domain symbol (for example, an OFDM symbol). Herein, the second time unit includes one or more first time units.

Optionally, the second mapping relationship may be implemented by using an index table or a logic judgment statement, and an implementation mode is relatively flexible.

Therefore, the network device may determine the bit length of the frequency domain resource location information in the DCI based on the location of the target first time unit in the second time unit and the second mapping relationship, so that the network device can allocate the proper frequency domain resource to the terminal device; and obtain the corresponding bit length of the DCI, helping to reduce bit redundancy of the DCI.

According to a seventh aspect, a terminal device is provided and is configured to perform the method according to any one of the first aspect or the possible implementations of the first aspect. Specifically, the terminal device includes modules configured to perform the method according to any one of the first aspect or the possible implementations of the first aspect.

According to an eighth aspect, a network device is provided and is configured to perform the method according to any one of the second aspect or the possible implementations of the second aspect. Specifically, the network device includes modules configured to perform the method according to any one of the second aspect or the possible implementations of the second aspect.

According to a ninth aspect, a network device is provided and is configured to perform the method according to any one of the third aspect or the possible implementations of the third aspect. Specifically, the network device includes modules configured to perform the method according to any one of the third aspect or the possible implementations of the third aspect.

According to a tenth aspect, a terminal device is provided and is configured to perform the method according to any one of the fourth aspect or the possible implementations of the fourth aspect. Specifically, the terminal device includes modules configured to perform the method according to any one of the fourth aspect or the possible implementations of the fourth aspect.

According to an eleventh aspect, a terminal device is provided and is configured to perform the method according to any one of the fifth aspect or the possible implementations of the fifth aspect. Specifically, the terminal device includes modules configured to perform the method according to any one of the fifth aspect or the possible implementations of the fifth aspect.

According to a twelfth aspect, a network device is provided and is configured to perform the method according to any one of the sixth aspect or the possible implementations of the sixth aspect. Specifically, the network device includes modules configured to perform the method according to any one of the sixth aspect or the possible implementations of the sixth aspect.

According to a thirteenth aspect, a terminal device is provided. The terminal device includes a processor, a memory, and a communications interface. The processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the first aspect or the possible implementations of the first aspect.

According to a fourteenth aspect, a network device is provided. The network device includes a processor, a memory, and a communications interface. The processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the second aspect or the possible implementations of the second aspect.

According to a fifteenth aspect, a terminal device is provided. The terminal device includes a processor, a memory, and a communications interface. The processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the third aspect or the possible implementations of the third aspect.

According to a sixteenth aspect, a network device is provided. The network device includes a processor, a memory, and a communications interface. The processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the fourth aspect or the possible implementations of the fourth aspect.

According to a seventeenth aspect, a terminal device is provided. The terminal device includes a processor, a memory, and a communications interface. The processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the fifth aspect or the possible implementations of the fifth aspect.

According to an eighteenth aspect, a network device is provided. The network device includes a processor, a memory, and a communications interface. The processor and the memory are connected to the communications interface. The memory is configured to store an instruction, the processor is configured to execute the instruction, and the communications interface is configured to communicate with another network element under control of the processor. When the processor executes the instruction stored in the memory, the execution enables the processor to perform the method according to any one of the sixth aspect or the possible implementations of the sixth aspect.

According to a nineteenth aspect, a computer-readable storage medium is provided. The computer-readable storage medium stores a program, and the program enables a terminal device to perform the control information transmission method according to any one of the first aspect or the implementations of the first aspect.

According to a twentieth aspect, a computer-readable storage medium is provided. The computer-readable storage medium stores a program, and the program enables a network device to perform the control information transmission method according to any one of the second aspect or the implementations of the second aspect.

According to a twenty-first aspect, a computer-readable storage medium is provided. The computer-readable storage medium stores a program, and the program enables a network device to perform the control information transmission method according to any one of the third aspect or the implementations of the third aspect.

According to a twenty-second aspect, a computer-readable storage medium is provided. The computer-readable storage medium stores a program, and the program enables a terminal device to perform the control information transmission method according to any one of the fourth aspect or the implementations of the fourth aspect.

According to a twenty-third aspect, a computer-readable storage medium is provided. The computer-readable storage medium stores a program, and the program enables a terminal device to perform the control information transmission method according to any one of the fifth aspect or the implementations of the fifth aspect.

According to a twenty-fourth aspect, a computer-readable storage medium is provided. The computer-readable storage medium stores a program, and the program enables a network device to perform the control information transmission method according to any one of the sixth aspect or the implementations of the sixth aspect.

According to a twenty-fifth aspect, a computer program product including an instruction is provided. When the computer program product is run on a computer, the computer is enabled to perform the method according to any one of the foregoing aspects or the possible implementations of the foregoing aspects.

DETAILED DESCRIPTION OF ILLUSTRATIVE EMBODIMENTS

The following describes technical solutions in this application with reference to accompanying drawings.

It should be understood that the technical solutions in the embodiments of this application may be applied to various communications systems, for example, a long term evolution (LTE) system, an LTE frequency division duplex (FDD) system, an LTE time division duplex (TDD) system, and other current communications systems; and in particular, applied to a future 5G new radio (NR) system, a 5G system, or a communications system based on an orthogonal frequency division multiplexing (OFDM) technology.

Figure 1:
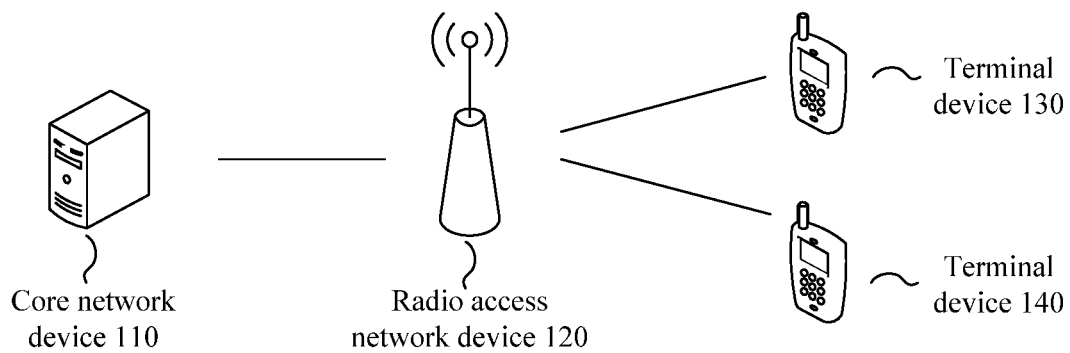
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different independent physical devices, or functions of the core network device and logical functions of the radio access network device may be integrated into one physical device, or a physical device may integrate some functions of the core network device and some functions of the radio access network device. The terminal device may be at a fixed location, or may be mobile. It should be understood that FIG. 1 is merely a schematic diagram, and the communications system may further include another network device, for example, may further include a wireless relay device and a wireless backhaul device (not shown in FIG. 1). Quantities of core network devices, radio access network devices, and terminal devices that are included in the mobile communications system are not limited in this embodiment of this application.

The radio access network device is an access device through which the terminal device accesses the mobile communications system in a wireless manner, and may be a NodeB, an evolved NodeB (eNodeB), a gNodeB (gNB) in a 5G mobile communications system, a base station in a future mobile communications system, an access node in a WiFi system, or the like. A specific technology and a specific device form that are used by the radio access network device are not limited in this embodiment of this application.

The terminal device may also be referred to as a terminal, user equipment (UE), a mobile station (MS), a mobile terminal (MT), or the like. The terminal device may be a mobile phone, a tablet computer (Pad), a computer with wireless transmitting and receiving functions, a virtual reality (VR) terminal device, an augmented reality (AR) terminal device, a wireless terminal in industrial control, a wireless terminal in self driving, a wireless terminal in remote medical surgery a wireless terminal in a smart grid, a wireless terminal in transportation safety, a wireless terminal in a smart city, a wireless terminal in a smart home, or the like.

The radio access network device and the terminal device may be deployed on land, including indoors or outdoors, handheld or in-vehicle; or may be deployed on a water surface; or may be deployed in an airplane, a balloon, or a satellite in the air. An application scenario of the radio access network device and the terminal device is not limited in this embodiment of this application.

This embodiment of this application may be applied to downlink signal transmission, or may be applied to uplink signal transmission, or may be applied to device to device (D2D) signal transmission. For downlink signal transmission, a transmitting device is a radio access network device, and a corresponding receiving device is a terminal device. For uplink signal transmission, a transmitting device is a terminal device, and a corresponding receiving device is a radio access network device. For D2D signal transmission, a transmitting device is a terminal device, and a corresponding receiving device is also a terminal device. A signal transmission direction is not limited in this embodiment of this application.

A licensed spectrum may be used for communication between the radio access network device and the terminal device, and between terminal devices, or an unlicensed spectrum may be used for the communication, or both a licensed spectrum and an unlicensed spectrum may be used for the communication. A frequency spectrum below 6 gigahertz (GHz) may be used for the communication between the radio access network device and the terminal device, and between the terminal devices, or a frequency spectrum above 6 GHz may be used for the communication, or both a frequency spectrum below 6 GHz and a frequency spectrum above 6 GHz may be used for the communication. A frequency spectrum resource used between the radio access network device and the terminal device is not limited in this embodiment of this application.

Figure 2:
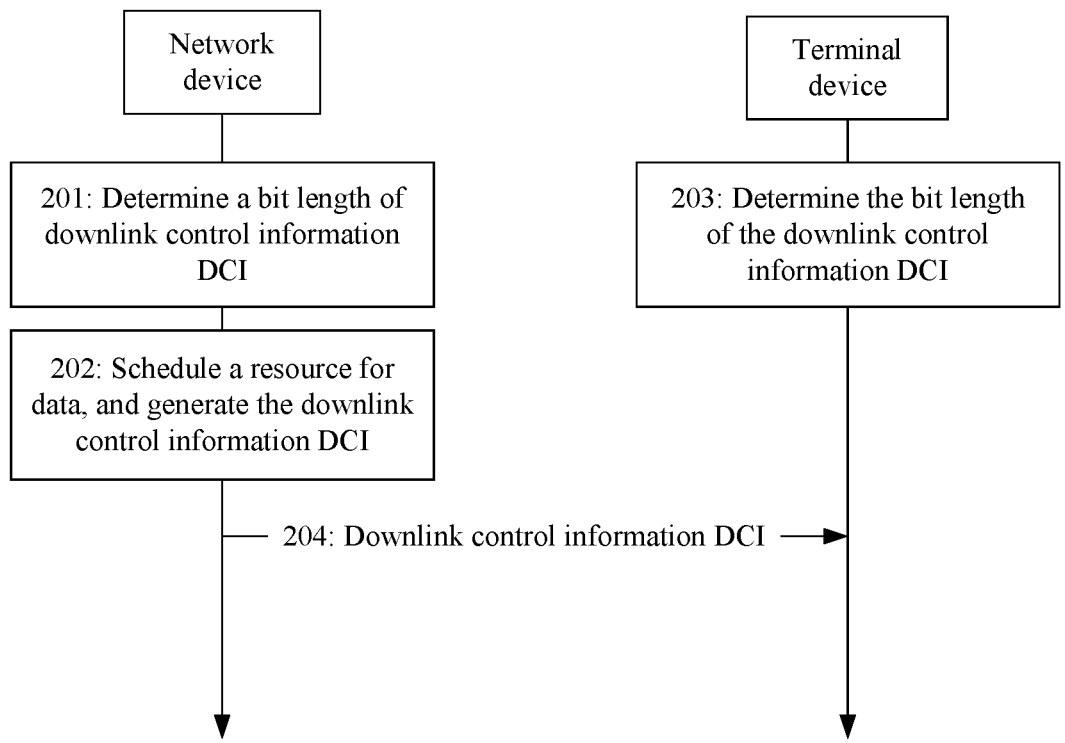
FIG. 2 is a schematic interaction diagram of a control information transmission method according to an embodiment of this application.

FIG. 2 is a schematic interaction diagram of a control information transmission method 200 according to an embodiment of this application. For example, a network device in FIG. 2 may be the radio access network device 120 in FIG. 1, and a terminal device in FIG. 2 may be the terminal device 130 or the terminal device 140 in FIG. 1. As shown in FIG. 2, the method 200 includes the following steps.

S201: The network device determines a bit length of downlink control information (DCI), where the DCI includes time domain resource location information.

Specifically, the network device determines a bit length of the time domain resource location information in the DCI based on a location of a target first time unit in a second time unit, where the time domain resource location information is used to indicate at least one of time domain length information of a third time unit and time domain start location information for data transmission scheduled based on the DCI, the DCI is carried in the target first time unit, a time domain length of the third time unit is less than or equal to a time domain length of the second time unit, and the third time unit is configured to transmit data scheduled based on the DCI.

Optionally, a first time unit, the second time unit, and the third time unit are concepts of different time granularities. For example, the second time unit is a slot, the third time unit is a mini-slot, and the first time unit is a time domain symbol (for example, an OFDM symbol). Herein, the time domain length of the third time unit may be less than or equal to the time domain length of the second time unit, the third time unit may include one or more first time units, and the second time unit includes one or more first time units.

Optionally, the time domain length information of the third time unit is used to indicate a quantity of first time units included in the third time unit. For example, one mini-slot may include one or more time domain symbols.

It should be noted that, in this embodiment of this application, the first time unit included in the third time unit may include the first time unit in which the DCI is located, or may not include the first time unit in which the DCI is located. This is not limited.

Herein, the DCI is carried in the target first time unit. It should be noted that the DCI may be carried in a plurality of first time units, but only the target first time unit is used as an example for description herein. Optionally, the target first time unit is the $1^{st}$ first time unit that carries the DCI.

For example, the network device may determine, based on a location of a target time domain symbol in a slot, a length or a total quantity of bits occupied by the time domain resource location information in the DCI. The time domain resource location information is used to indicate time domain length information of a mini-slot and/or the time domain start location information for the data transmission scheduled based on the DCI.

Optionally, the time domain start location information may indicate an absolute start location, for example, the time domain start location information indicates the first time unit; or may indicate a relative start location, for example, the time domain start location information indicates a start location relative to the first time unit in which the DCI is located. This is not limited.

Optionally, the time domain resource location information may be used to indicate the at least one of the time domain length information of the third time unit and the time domain start location information for the data transmission scheduled based on the DCI. For example, the time domain resource location information may be used to indicate the time domain start location information for the data transmission scheduled based on the DCI; or for another example, the time domain resource location information may be used to indicate the time domain length information of the third time unit; or for still another example, the time domain resource location information may be used to indicate not only the time domain start location information for the data transmission scheduled based on the DCI, but also the time domain length information of the third time unit for the data transmission scheduled based on the DCI.

The DCI may include many fields, such as frequency domain location information of data, a modulation and coding scheme (MCS), a redundancy version (RV), a new data indicator (NDI), and a hybrid automatic repeat request (HARQ) process number; and may also include the time domain resource location information in this embodiment of this application.

After determining the bit length of the time domain resource location information in the DCI, the network device may further determine the bit length of the DCI with reference to a length of another field.

S202: The network device schedules a resource for data, and generates the DCI.

S203: The terminal device determines the bit length of the downlink control information DCI, where the DCI includes the time domain resource location information.

Specifically, the terminal device determines the bit length of the time domain resource location information in the DCI based on the location of the target first time unit in the second time unit. The time domain resource location information is used to indicate the at least one of the time domain length information of the third time unit and the time domain start location information for the data transmission scheduled based on the DCI. The DCI is carried in the target first time unit. The time domain length of the third time unit is less than or equal to the time domain length of the second time unit.

S204: The network device sends the DCI in the target first time unit, and sends the data on a time domain resource indicated by the time domain resource location information.

Correspondingly, the terminal device may receive, in the target first time unit, the DCI sent by the network device.

For brevity, explanations of concepts or terms similar to those of a network device side are not provided herein.

Herein, the bit length of the DCI is a payload size of the DCI.

Optionally, the terminal device may determine the bit length of the DCI based on the bit length of the time domain resource location information in the DCI.

Optionally, the terminal device demodulates and decodes the DCI based on the bit length of the DCI.

Specifically, the terminal device may determine the bit length of the time domain resource location information in the DCI based on the location of the target first time unit in the second time unit. Then, the terminal device may determine the bit length of the DCI based on the bit length of the time domain resource location information in the DCI. Afterwards, the terminal device receives, in the target first time unit, the DCI sent by the network device, and demodulates and decodes the DCI based on the bit length of the DCI. Herein, the bit length of the DCI is a size adapting to a requirement of the DCI corresponding to the target first time unit, thereby reducing a waste of the bit length of the DCI.

For example, if the bit length of the time domain resource location information in the DCI is 4, the terminal device determines that the payload size of the DCI is (X+4) bits, where X is a bit length of other information in the DCI. In this case, the terminal device needs to check only the payload size of (X+4) bits. However, in a current technology, 6 bits are used to indicate time domain resource location information uniformly. As a result, redundant bits exist, reducing transmission efficiency at an air interface. Compared with the current technology, the control information transmission method used in this embodiment of this application can reduce a quantity of bits in the DCI, improving control information transmission efficiency at an air interface. In addition, the bit length used in this embodiment of this application is for a particular time domain symbol, and the bit length of the DCI is fixed. Therefore, this avoids blind detection on DCI of different bit lengths, reducing complexity of a receiver.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be further understood that, in the embodiments of this application, "first", "second", and the like are introduced only to distinguish between different objects, for example, to distinguish between different time units, but do not constitute any limitation on the embodiments of this application.

It should be noted that any symbol in the embodiments of this application is a time domain symbol, for example, an OFDM time domain symbol, unless otherwise specified.

In this embodiment of this application, the first time unit included in the third time unit may include the first time unit in which the DCI is located, or may not include the first time unit in which the DCI is located. In addition, the first time unit configured to transmit the DCI and a first time unit configured to transmit data may be consecutive in time, or may be inconsecutive in time. This is not limited. Further, the first time unit carrying the DCI may carry or not carry the data. The following provides a description with reference to FIG. 3 to FIG. 6. Specifically, the description is provided with the third time unit being a mini-slot, the second time unit being a slot, and the first time unit being a time domain symbol.

Figure 3:
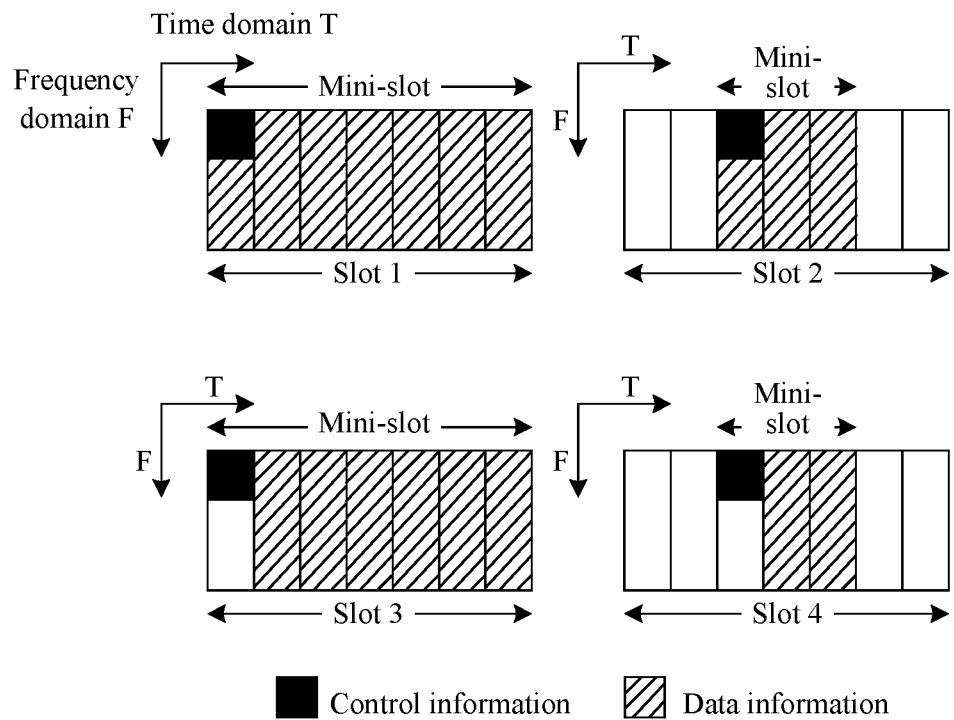
FIG. 3 is a schematic diagram of an example of a mini-slot.

FIG. 3 is a schematic diagram of an example of a mini-slot. As shown in FIG. 3, a time domain symbol in which control information is located and time domain symbols in which data information is located are consecutive in time. For example, a slot 1 in FIG. 3 may be represented by a bitmap 1111111. Two upper diagrams (including the slot 1 and a slot 2) in FIG. 3 indicate that data may be sent in a time domain symbol in which control information is located, and two lower diagrams (including a slot 3 and a slot 4) in FIG. 3 indicate that data is not sent in a time domain symbol in which control information is located.

Figure 4:
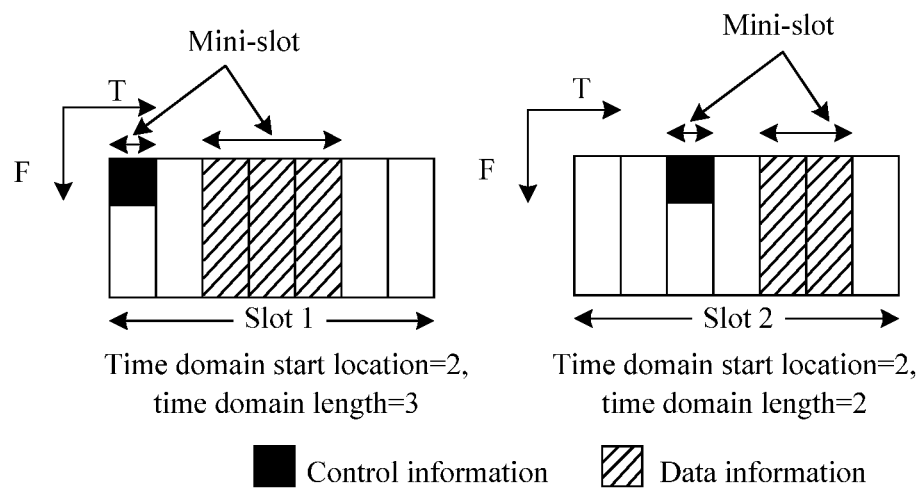
FIG. 4 is a schematic diagram of another example of a mini-slot.

FIG. 4 is a schematic diagram of another example of a mini-slot. A difference from FIG. 3 is that a time domain symbol in which control information is located and time domain symbols in which data information is located may be inconsecutive in time, but the time domain symbols in which the data information is located are consecutive in time. In FIG. 4, a time domain start location (which may also be referred to as a location offset, which is also the same hereinafter) refers to an interval between a time domain symbol in which the control information is located and the $1^{st}$ time domain symbol in which the data information is located, and a time domain length refers to a quantity of the time domain symbols occupied by the data information. As shown in FIG. 4, for a slot 1 or a slot 2, a length of a mini-slot is a quantity of all time domain symbols occupied by control information and data information. The mini-slot in the slot 1 includes a time domain symbol 1, a time domain symbol 3, a time domain symbol 4, and a time domain symbol 5, and the mini-slot in the slot 2 includes a time domain symbol 3, a time domain symbol 5, and a time domain symbol 6. In FIG. 4, an interval between the time domain symbol 1 and the time domain symbol 3 that are in the slot 1 is 2, and a quantity of time domain symbols occupied by the data information in the slot 1 is 3. An interval between the time domain symbol 3 and the time domain symbol 5 that are in the slot 2 is 2, and a quantity of time domain symbols occupied by the data information in the slot 1 is 2.

Figure 5:
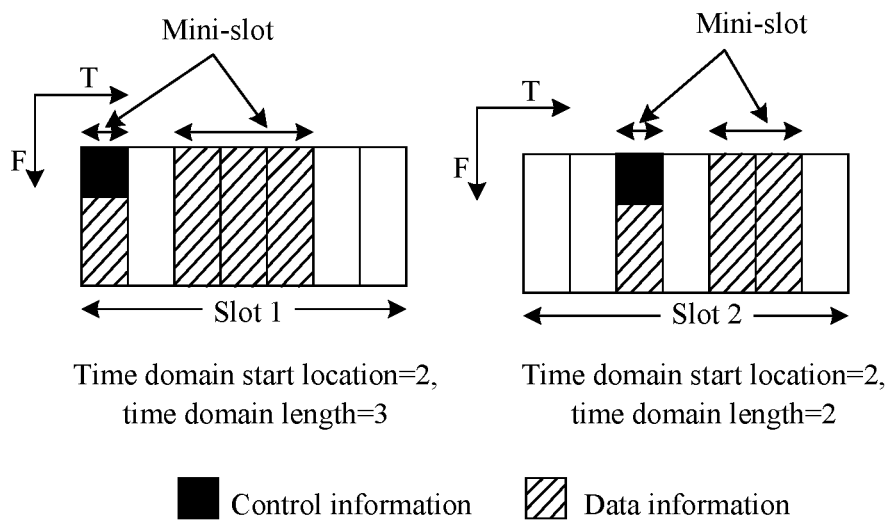
FIG. 5 is a schematic diagram of still another example of a mini-slot.

FIG. 5 is a schematic diagram of still another example of a mini-slot. As shown in FIG. 5, a difference from FIG. 4 is that time domain symbols in which control information and data information are located may be inconsecutive in time, but the data information may be carried in a time domain symbol in which the control information is located. In FIG. 5, a time domain start location refers to an interval between the time domain symbol in which the control information is located and the $1^{st}$ time domain symbol in which the data information is located, and a time domain length refers to a quantity of time domain symbols occupied by the data information. As shown in FIG. 5, for a slot 1 or a slot 2, a length of a mini-slot is a quantity of all time domain symbols occupied by control information and data information. The mini-slot in the slot 1 includes a time domain symbol 1, a time domain symbol 3, a time domain symbol 4, and a time domain symbol 5, and the mini-slot in the slot 2 includes a time domain symbol 3, a time domain symbol 5, and a time domain symbol 6. In FIG. 5, an interval between the time domain symbol 1 and the time domain symbol 3 that are in the slot 1 is 2, and a quantity of time domain symbols occupied by the data information in the slot 1 is 3. An interval between the time domain symbol 3 and the time domain symbol 5 that are in the slot 2 is 2, and a quantity of time domain symbols occupied by the data information in the slot 1 is 2.

In FIG. 3 to FIG. 5, the length of the mini-slot is defined as the quantity of all the time domain symbols occupied by the control information and the data information.

Figure 6:
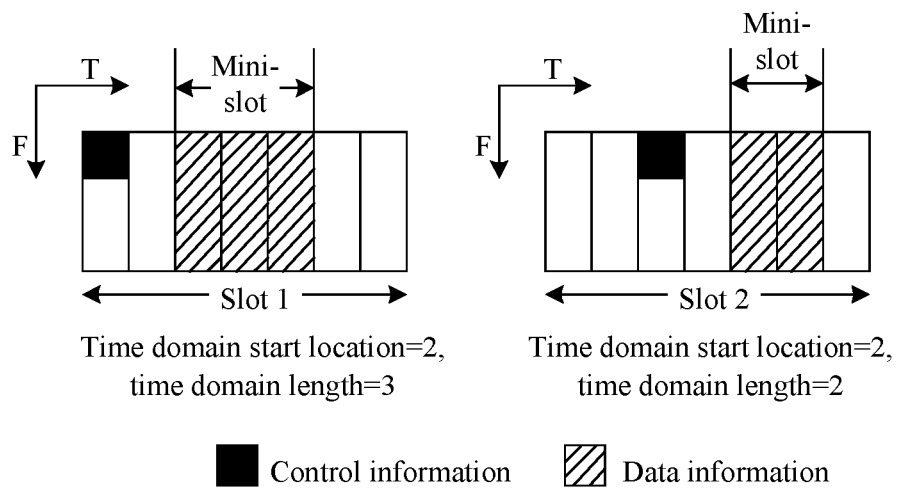
FIG. 6 is a schematic diagram of yet another example of a mini-slot.

FIG. 6 is a schematic diagram of yet another example of a mini-slot. As shown in FIG. 6, a difference from FIG. 3 to FIG. 5 is that a length of a mini-slot is defined as a quantity of time domain symbols occupied by all data information. In FIG. 6, a time domain start location refers to an interval between a time domain symbol in which control information is located and the $1^{st}$ time domain symbol in which the data information is located, and a time domain length refers to a quantity of the time domain symbols occupied by the data information. As shown in FIG. 6, for a slot 1 or a slot 2, a length of a mini-slot is a quantity of all time domain symbols occupied by data information. The mini-slot in the slot 1 includes a time domain symbol 3, a time domain symbol 4, and a time domain symbol 5, and the mini-slot in the slot 2 includes a time domain symbol 5 and a time domain symbol 6. In FIG. 6, an interval between a time domain symbol 1 and the time domain symbol 3 that are in the slot 1 is 2, and the quantity of the time domain symbols occupied by the data information in the slot 1 is 3. An interval between a time domain symbol 3 and the time domain symbol 5 that are in the slot 2 is 2, and the quantity of the time domain symbols occupied by the data information in the slot 1 is 2.

It should be understood that the examples in FIG. 3 to FIG. 6 are introduced only for easy understanding of the technical solutions in the embodiments of this application, but do not constitute any limitation on the protection scope of the embodiments of this application.

To sum up, a relationship between the first time units in the third time unit may include the following cases.

(1) The first time unit configured to carry the DCI and the first time unit configured to carry the data are consecutive in time, and the first time unit configured to carry the DCI is not configured to carry the data.

(2) The first time unit configured to carry the DCI and the first time unit configured to carry the data are consecutive in time, and the first time unit configured to carry the DCI may also be configured to carry the data.

(3) The first time unit configured to carry the DCI and the first time unit configured to carry the data are inconsecutive in time, and the first time unit configured to carry the DCI is not configured to carry the data.

(4) The first time unit configured to carry the DCI and the first time unit configured to carry the data are inconsecutive in time, and the first time unit configured to carry the DCI may also be configured to carry the data.

It should be understood that the technical solutions in the embodiments of this application are applicable to all the foregoing cases.

Optionally, in this embodiment of this application, "a first mapping relationship" is introduced, so that the network device or the terminal device may learn of, with reference to the first mapping relationship, bit lengths of time domain resource location information corresponding to different time units. The following describes details.

Optionally, S201 may include: determining, by the network device, the bit length of the time domain resource location information in the DCI based on the location of the target first time unit in the second time unit and the first mapping relationship, where the first mapping relationship is used to indicate a correspondence between an index of the location of the target first time unit in the second time unit and the bit length of the time domain resource location information in the DCI.

The determining a bit length of DCI includes: determining, by the network device, the bit length of the DCI based on the bit length of the time domain resource location information in the DCI.

Alternatively, optionally, the network device may determine the bit length of the DCI based on the location of the target first time unit in the second time unit and the first mapping relationship.

Similarly, optionally, S203 may include: determining, by the terminal device, the bit length of the time domain resource location information in the DCI based on the location of the target first time unit in the second time unit and the first mapping relationship, where the first mapping relationship is used to indicate the correspondence between the index of the location of the target first time unit in the second time unit and the bit length of the time domain resource location information in the DCI.

The determining a bit length of DCI includes: determining, by the terminal device, the bit length of the DCI based on the bit length of the time domain resource location information in the DCI.

Alternatively, optionally, the terminal device may determine the bit length of the DCI based on the location of the target first time unit in the second time unit and the first mapping relationship.

In this embodiment of this application, the network device or the terminal device may determine, based on the location of the target first time unit in the second time unit and the first mapping relationship, the bit length required by the time domain resource location information in the DCI. Herein, the first mapping relationship may be used to indicate the correspondence between the index (for example, a symbol number or index) of the location of the target first time unit in the second time unit and the bit length of the time domain resource location information in the DCI. The first mapping relationship may include a plurality of correspondences. Each correspondence is a correspondence between an index of a location of each first time unit in the second time unit and a bit length of time domain resource location information in DCI.

For ease of understanding, the following uses Table 1 as an example of the first mapping relationship for description.

TABLE 1

| DCI symbol index | Bit length of time domain start location information | Bit length of time domain length information | Bit length of time domain resource location information | Grade |
|---|---|---|---|---|
| 0 | 3 | 3 | 6 | 1 |
| 1 | 3 | 3 | 6 | |
| 2 | 3 | 3 | 6 | |
| 3 | 2 | 2 | 4 | 2 |
| 4 | 2 | 2 | 4 | |

TABLE 1-continued

| DCI symbol index | Bit length of time domain start location information | Bit length of time domain length information | Bit length of time domain resource location information | Grade |
|---|---|---|---|---|
| 5 | 1 | 1 | 2 | 3 |
| 6 | 0 | 0 | 0 | 4 |

A slot with 7 time domain symbols is used as an example. In Table 1, index numbers in the $1^{st}$ column (DCI symbol index) are indexes of locations of the first time units in the second time unit, the $2^{nd}$ column lists bit lengths of time domain start location information, the $3^{rd}$ column lists bit lengths of time domain length information, the $4^{th}$ column lists bit lengths of time domain resource location information, and the $5^{th}$ column lists grades classified based on bit lengths of different time domain resource location information. This does not constitute any limitation on this embodiment of this application. In Table 1, symbol indexes 0 to 2 use 6 bits (corresponding to a grade 1), symbol indexes 3 and 4 use 4 bits (corresponding to a grade 2), a symbol index 5 uses 2 bits (corresponding to a grade 3), and a symbol index 6 uses 0 bits (corresponding to a grade 4). For the symbol index 6, time domain start location information and time domain length information are not required.

It should be understood that the foregoing first mapping relationship may be agreed in advance, and may be learned by both the network device and the terminal device.

It should be further understood that the foregoing uses Table 1 only as an example for description, and Table 1 does not constitute any limitation on this embodiment of this application. A person skilled in the art may reorganize or transform Table 1 to adapt to an actual need.

It should be further understood that Table 1 is used only as an example of the first mapping relationship in the foregoing description, and the first mapping relationship in Table 1 does not constitute any limitation on this embodiment of this application. A person skilled in the art may reorganize or transform Table 1 to adapt to an actual need. In other words, the foregoing table lookup manner is only a specific implementation. A person skilled in the art may implement the foregoing joint coding by using another implementation, for example, implement the foregoing coding by using a coding scheme such as a C language, a C++ language, a VB language, or a JAVA language. Specifically, for example, a person skilled in the art may implement various possibilities in the foregoing mapping relationship by using only an if . . . else statement, a for statement, or a while statement, but does not need to introduce the mapping relationship table shown by Table 1.

For example, the network device may look up in the foregoing first mapping relationship based on a symbol index, to learn of a total bit length of time domain resource location information in DCI, a bit length of a time domain start location for data transmission scheduled based on the DCI, and a bit length of a data symbol for the data transmission scheduled based on the DCI. For example, when the symbol index is 3, the network device may learn, based on the first mapping relationship, that the bit length of the time domain resource location information in the DCI is 4 bits, a bit length of time domain start location information is 2 bits, and a bit length of time domain length information is 2 bits. In this case, the network device schedules a resource for data, generates the DCI, then sends the DCI in a time domain symbol whose symbol index is 3, and sends the data in a corresponding data symbol.

For example, the terminal device may look up in the foregoing first mapping relationship based on a symbol index, to learn of a total bit length of time domain resource location information in DCI, a bit length of a time domain start location for data transmission scheduled based on the DCI, and a bit length of a data symbol for the data transmission scheduled based on the DCI. Further, the terminal device may determine a bit length of the DCI. For example, when the symbol index is 3, the terminal device may learn, based on the first mapping relationship, that the bit length of the time domain resource location information in the DCI is 4 bits, a bit length of time domain start location information is 2 bits, and a bit length of time domain length information is 2 bits. The terminal device may learn that the bit length of the DCI is 4 bits. In this case, the terminal device may receive, in the time domain symbol whose symbol index is 3, the DCI sent by the network device, and perform check and decoding based on the bit length of the DCI, to obtain a time domain start location and a time domain length (for example, a quantity of data symbols) for the DCI-based actual transmission.

Optionally, in this embodiment of this application, several extra unused bits in the DCI may be used as reserved bits, and are reserved for another possible purpose. The terminal device may learn, based on the symbol index, whether reserved bits exist in the received DCI, and reception by the terminal device is not affected. It should be understood that only a possible case is described herein, that is, reserved bits may exist in some DCI, but this does not constitute any limitation on this embodiment of this application.

To sum up, the network device or the terminal device may determine the bit length of the time domain resource location information in the DCI based on the symbol index and the first mapping relationship.

In this embodiment of this application, the terminal device may determine, based on the location of the target first time unit in the second time unit, the bit length of the time domain resource location information that adapts to the DCI. This ensures that a bit length of DCI in each time unit is a single fixed value, and also ensures that the bit length of the DCI in each time unit is a size adapting to a current requirement of the DCI. Therefore, this can avoid blind detection on the DCI of different bit lengths, reducing complexity of the receiver of the terminal device; and can also reduce bit redundancy, improving DCI transmission efficiency at an air interface.

The foregoing describes the embodiment in which the network device or the terminal device may determine the bit length of the time domain resource location information in the downlink control information DCI based on the location of the target first time unit in the second time unit. Information related to the scheduled data may further include frequency domain resource location information. The following provides an embodiment related to "frequency domain resource location information." It should be understood that a person skilled in the art may learn that the embodiment of the "frequency domain resource location information" may be used in combination with the embodiment (including the foregoing method 200) of the "time domain resource location information", or may be implemented independently. This is not limited. The following describes this embodiment in detail. For a network device side, this embodiment may include: determining, by a network device, a bit length of frequency domain resource location information in DCI based on a location of a target first time unit in a second time unit, where the frequency domain resource location information is used to indicate a location of a frequency domain resource used for data transmission scheduled based on the DCI.

Further, the network device may determine a bit length of the DCI based on the bit length of the frequency domain resource location information in the DCI.

Optionally, the determining, by a network device, a bit length of frequency domain resource location information in DCI based on a location of a target first time unit in a second time unit specifically includes: determining, by the network device, the bit length of the frequency domain resource location information in the DCI based on the location of the target first time unit in the second time unit and a second mapping relationship, where the second mapping relationship is used to indicate a correspondence between an index of the location of the target first time unit in the second time unit and the bit length of the frequency domain resource location information in the DCI.

Specifically, the network device may determine the bit length of the frequency domain resource location information in the DCI based on the location of the target first time unit in the second time unit and the second mapping relationship, so that the network device can allocate a proper frequency domain resource, for example, a physical resource block (PRB), to a terminal device; and obtain the corresponding bit length of the DCI, helping to reduce bit redundancy of the DCI.

Correspondingly, for a terminal device side, this embodiment may include: determining, by the terminal device, the bit length of the frequency domain resource location information in the DCI based on the location of the target first time unit in the second time unit, where the frequency domain resource location information is used to indicate the location of the frequency domain resource used for the data transmission scheduled based on the DCI.

Further, the terminal device may determine the bit length of the DCI based on the bit length of the frequency domain resource location information in the DCI.

Optionally, the determining, by the terminal device, the bit length of the frequency domain resource location information in the DCI based on the location of the target first time unit in the second time unit specifically includes: determining, by the terminal device, the bit length of the frequency domain resource location information in the DCI based on the location of the target first time unit in the second time unit and the second mapping relationship, where the second mapping relationship is used to indicate the correspondence between the index of the location of the target first time unit in the second time unit and the bit length of the frequency domain resource location information in the DCI.

Specifically, the terminal device may determine the bit length of the frequency domain resource location information in the DCI based on the location of the target first time unit in the second time unit and the second mapping relationship, thereby reducing a quantity of bits in the DCI, and improving DCI transmission efficiency at an air interface.

In this embodiment of this application, "the second mapping relationship" is introduced, so that the network device or the terminal device can learn of, with reference to the second mapping relationship, bit lengths of frequency domain resource location information corresponding to different time units. The following describes details.

Herein, the second mapping relationship may be used to indicate the correspondence between the index (for example, a number) of the location of the target first time unit in the second time unit and the bit length of the frequency domain resource location information in the DCI. The second mapping relationship may include a plurality of correspondences. Each correspondence is a correspondence between an index of a location of each first time unit in the second time unit and a bit length of frequency domain resource location information in DCI.

For ease of understanding, the following uses Table 2 as an example of the second mapping relationship for description.

TABLE 2

| DCI symbol index | Maximum length of data that can be scheduled | Frequency domain resource scheduling granularity (a quantity of PRBs) | Bit length of frequency domain resource location information |
|---|---|---|---|
| 0 | 7 | 8 | 13 |
| 1 | 6 | 10 | 10 |
| 2 | 5 | 10 | 10 |
| 3 | 4 | 15 | 7 |
| 4 | 3 | 15 | 7 |
| 5 | 2 | 25 | 4 |
| 6 | 1 | 50 | 2 |

A slot with 7 time domain symbol lengths is used as an example. In Table 2, index numbers in the $1^{st}$ column (DCI symbol index) are indexes of locations of first time units in the second time unit, the $2^{nd}$ column lists maximum lengths of data that can be scheduled, the $3^{rd}$ column lists frequency domain resource scheduling granularities, and the $4^{th}$ column lists bit lengths of frequency domain resource location information (also referred to as a quantity of bits required by a frequency domain location information field) in DCI.

For the $3^{rd}$ column and the $4^{th}$ column, it is assumed that an available resource per unit time-frequency resource block (for example, a time-frequency resource block of a symbols*b subcarriers, where a and b are integers) is fixed. In this case, a shorter length of a mini-slot indicates a smaller quantity of symbols and a greater frequency domain granularity per unit time-frequency resource block. A greater frequency domain granularity per unit time-frequency resource block also means a smaller quantity of bits required by the frequency domain location information field in a case of a same bandwidth. For example, for a 20 MHz system bandwidth, a subcarrier spacing is 15 kHz, and there are a total of 100 PRBs. For example, if a quantity of PRBs corresponding to a symbol index 0 is 8, a corresponding value of total bits is 13, that is, an integer obtained by rounding up a quotient of 100 divided by 8. In the foregoing second mapping relationship, a smaller symbol index of a symbol means a larger maximum length of data that can be scheduled in the symbol, and a larger quantity of bits required by the frequency domain location information field. Contrarily, a larger symbol index of a symbol means a smaller maximum length of data that can be scheduled in the symbol, and a smaller quantity of bits required by the frequency domain location information field.

It should be understood that content of the $2^{nd}$ column and the $3^{rd}$ column is introduced into Table 2 just to deduce the $4^{th}$ column. Therefore, substantive content of Table 2 may be only content of the $1^{st}$ column and the $4^{th}$ column, and this is not limited.

It should be further understood that the foregoing second mapping relationship may be agreed in advance, and may be learned by both the network device and the terminal device.

It should be further understood that the foregoing uses Table 2 only as an example for description, and Table 2 does not constitute any limitation on this embodiment of this application. A person skilled in the art may reorganize or transform Table 2 to adapt to an actual need.

It should be further understood that Table 2 is used only as an example of the second mapping relationship in the foregoing description, and the second mapping relationship in Table 2 does not constitute any limitation on this embodiment of this application. A person skilled in the art may reorganize or transform Table 2 to adapt to an actual need. In other words, the foregoing table lookup manner is only a specific implementation. A person skilled in the art may implement the foregoing joint coding by using another implementation, for example, implement the foregoing coding by using a coding scheme such as a C language, a C++ language, a VB language, or a JAVA language. Specifically, for example, a person skilled in the art may implement various possibilities in the foregoing mapping relationship by using only an if . . . else statement, a for statement, or a while statement, but does not need to introduce the mapping relationship table shown by Table 2.

For example, the network device may look up in Table 2 based on a symbol index, to learn of a bit length of frequency domain resource location information in DCI. For example, when the symbol index is 0, the network device may learn, according to Table 2, that the total bit length of the frequency domain resource location information in the DCI is 13. In this case, the network device schedules a resource for data, generates the DCI, then uses a corresponding PRB to send the DCI in a time domain symbol whose symbol index is 0, and sends the data in a corresponding data symbol.

For example, the terminal device may look up in the foregoing second mapping relationship based on a symbol index, to learn of a total bit length of frequency domain resource location information in DCI. For example, when the symbol index is 0, the terminal device may learn, based on the second mapping relationship, that the total bit length of the frequency domain resource location information in the DCI is 13. In this case, the terminal device uses a corresponding PRB to receive the DCI in a time domain symbol whose symbol index is 0, and receives data in a corresponding data symbol.

To sum up, the network device or the terminal device may determine the bit length of the frequency domain resource location information in the DCI based on the symbol index and the second mapping relationship.

In this embodiment of this application, the terminal device may determine, based on the location of the target first time unit in the second time unit, the bit length of the frequency domain resource location information that adapts to the DCI. This ensures that a bit length of DCI in each time unit is a single fixed value, and also ensures that a payload size of the DCI in each time unit is a size adapting to a current requirement of the DCI. Therefore, this can avoid blind detection on DCI of different sizes, reducing complexity of a receiver of the terminal device; and can also reduce a quantity of bits in the DCI, improving DCI transmission efficiency at an air interface.

Figure 7:
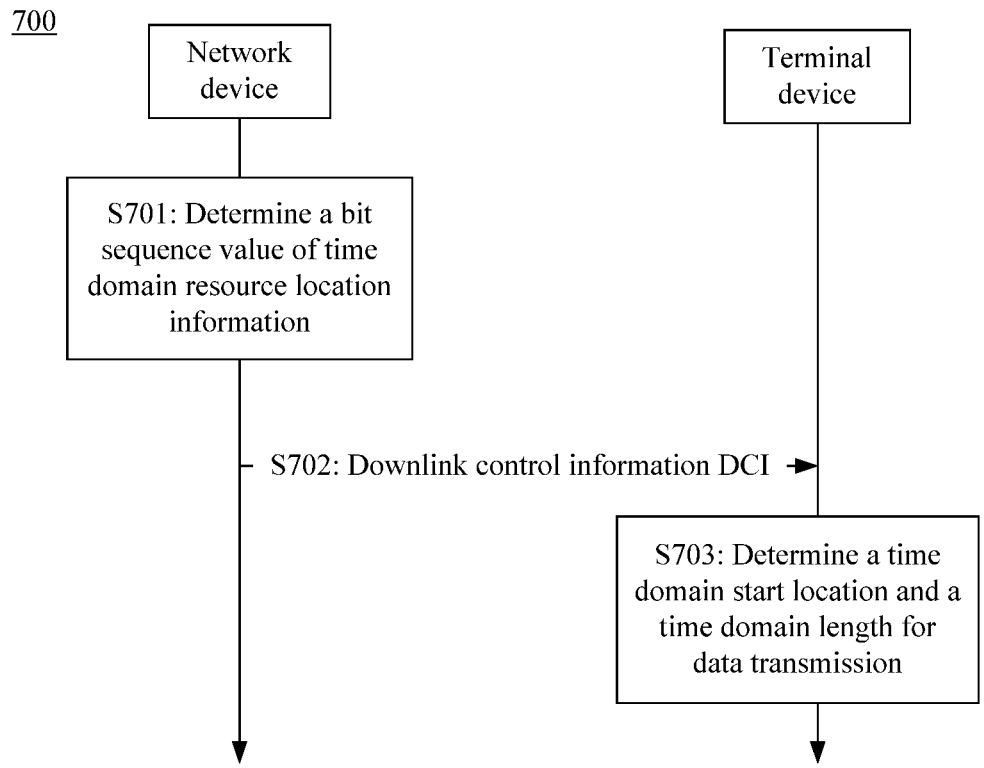
FIG. 7 is a schematic interaction diagram of a control information transmission method according to an embodiment of this application.

This application further provides an embodiment in which a joint coding scheme is used to perform joint coding for a time domain start location and a time domain length for data transmission. The following provides a description with reference to FIG. 7. FIG. 7 is a schematic interaction diagram of a control information transmission method 700 according to an embodiment of this application. For example, a network device in FIG. 7 may be the radio access network device 120 in FIG. 1, and a terminal device in FIG.

7 may be the terminal device 130 or the terminal device 140 in FIG. 1. As shown in FIG. 7, the method 700 includes the following steps.

S701: The network device determines a bit sequence value of time domain resource location information based on a time domain start location and a time domain length for data transmission, where the time domain resource location information is used to indicate a time domain resource for the data transmission.

Optionally, before S701, the network device may schedule a resource for data, and determine the time domain start location and the time domain length for the data transmission.

Optionally, time domain start location information may indicate an absolute start location, or may indicate a relative start location. This is not limited.

Optionally, the network device generates downlink control information DCI based on the bit sequence value.

S702: The network device sends the downlink control information DCI.

Optionally, the network device may send the data on the time domain resource indicated by the time domain resource location information.

Correspondingly, the terminal device receives the downlink control information DCI.

Optionally, the terminal device demodulates and decodes the DCI, where the DCI includes the time domain resource location information, and the time domain resource location information is used to indicate the time domain resource for the data transmission.

S703: The terminal device obtains the time domain resource location information, and determines, based on the time domain resource location information, the time domain start location and the time domain length for the data transmission.

Optionally, the terminal device receives the data on the time domain resource corresponding to the time domain start location and the time domain length.

Specifically, when scheduling the resource for the data, the network device may determine the time domain start location and the time domain length for the data transmission, and then determine the bit sequence value of the time domain resource location information based on the time domain start location and the time domain length for the data transmission, where the time domain resource location information is used to indicate the time domain resource for the data transmission. Then, the network device may generate the DCI based on the bit sequence value, send the DCI to the terminal device, and send the data on the time domain resource indicated by the time domain resource location information. Correspondingly, after receiving the DCI sent by the network device, the terminal device demodulates and decodes the DCI, to obtain the time domain resource location information. The terminal device may determine, based on the time domain resource location information, the time domain start location and the time domain length for the data transmission, so as to receive the data on the time domain resource corresponding to the time domain start location and the time domain length.

In this embodiment of this application, the network device may determine the bit sequence value of the time domain resource location information based on both the time domain start location and the time domain length for the data transmission, that is, the bit sequence is joint bits based on the "time domain start location" and the "time domain length". The joint coding scheme in this embodiment of this application can ensure that a bit length of DCI is the same in all time units. For example, for a URLLC service, a bit length of DCI is optimized in the joint coding scheme in this embodiment of this application, and a smaller bit length may be used. Compared with the current technology in which DCI needs to have (X+6) bits, where X represents a bit length of other information in the DCI, a bit length of DCI in this embodiment of this application may be (X+Y) bits, where Y is less than 6, and Y may be preset. Therefore, by using the technical solution in this embodiment of this application, a DCI length can be reduced.

Optionally, in this embodiment of this application, "a code mapping relationship" is introduced, so that the network device or the terminal device can learn, with reference to the code mapping relationship, the bit sequence value of the time domain resource location information corresponding to the time domain start location and the time domain length for the data transmission. The following describes details.

Optionally, S701 may include: determining, by the network device, the bit sequence value of the time domain resource location information based on the code mapping relationship, and the time domain start location and the time domain length for the data transmission, where the code mapping relationship is used to indicate a correspondence between the bit sequence value of the time domain resource location information and the time domain start location and the time domain length for the data transmission.

The code mapping relationship may include a plurality of correspondences. Each correspondence is a correspondence between a bit sequence value of time domain resource location information and a time domain start location and a time domain length for data transmission. A code mapping relationship used on a terminal device side in the following is also the same. For brevity, details are not described.

Similarly, optionally, S702 may include: determining, by the terminal device based on the time domain resource location information and the code mapping relationship, the time domain start location and the time domain length for the data transmission, where the code mapping relationship is used to indicate the correspondence between the bit sequence value of the time domain resource location information and the time domain start location and the time domain length for the data transmission.

For ease of understanding, the following uses Table 3 as an example of the code mapping relationship for description.

TABLE 3

| Time domain start location for data transmission | Time domain length | Bit sequence value $<b_0, b_1, b_2, b_3, b_4>$ |
|---|---|---|
| 0 | 1 | 00000 |
|   | 2 | 00001 |
|   | 3 | 00010 |
|   | 4 | 00011 |
|   | 5 | 00100 |
|   | 6 | 00101 |
|   | 7 | 00110 |
| 1 | 1 | 00111 |
|   | 2 | 01000 |
|   | 3 | 01001 |
|   | 4 | 01010 |
|   | 5 | 01011 |
|   | 6 | 01100 |
| 2 | 1 | 01101 |
|   | 2 | 01110 |
|   | 3 | 01111 |
|   | 4 | 10000 |
|   | 5 | 10001 |

TABLE 3-continued

| Time domain start location for data transmission | Time domain length | Bit sequence value $<b_0, b_1, b_2, b_3, b_4>$ |
|---|---|---|
| 3 | 1 | 10010 |
|   | 2 | 10011 |
|   | 3 | 10100 |
|   | 4 | 10101 |
| 4 | 1 | 10110 |
|   | 2 | 10111 |
|   | 3 | 11000 |
| 5 | 1 | 11001 |
|   | 2 | 11010 |
| 6 | 1 | 11011 |
| Reserved value |   | 11100 |
| Reserved value |   | 11101 |
| Reserved value |   | 11110 |
| Reserved value |   | 11111 |

A slot with 7 time domain symbols is used as an example. In Table 3, the joint coding scheme may be used. For example, 5 bits may be used for joint coding, and a bit length of time domain resource location information corresponding to each time domain start location is 5 bits. In Table 3, the $1^{st}$ column lists time domain start locations (which may also be referred to as location offsets) for data transmission, the $2^{nd}$ column lists time domain lengths for the data transmission, and the $3^{rd}$ column lists bit sequence values obtained by joint coding. In the lower part of Table 3, some bit sequence values may be reserved as reserved values for another possible purpose.

It should be understood that the foregoing code mapping relationship may be agreed in advance, and may be learned by both the network device and the terminal device.

It should be further understood that Table 3 is used only as an example of the code mapping relationship in the foregoing description, and the code mapping relationship in Table 3 does not constitute any limitation on this embodiment of this application. A person skilled in the art may reorganize or transform Table 3 to adapt to an actual need. In other words, the foregoing table lookup manner is only a specific implementation. A person skilled in the art may implement the foregoing joint coding by using another implementation, for example, implement the foregoing coding by using a coding scheme such as a C language, a C++ language, a VB language, or a JAVA language. Specifically, for example, a person skilled in the art may implement various possibilities in the foregoing code mapping relationship by using only an if . . . else statement, a for statement, or a while statement, but does not need to introduce the code mapping relationship table shown by Table 3.

For example, after determining a time domain start location and a time domain length, the network device may look up in Table 3 based on the time domain start location and the time domain length, to learn of a bit sequence value of time domain resource location information. For example, after determining that the time domain start location is 2 and the time domain length is 2, the network device may learn, by looking up in the table, that the corresponding bit sequence value is 01110. In this case, the network device may generate DCI based on 01110, and send the DCI to the terminal device. In addition, the network device sends data to the terminal device on a time domain resource indicated by the time domain resource location information.

In other words, the network device may determine the bit sequence value of the time domain resource location information based on the code mapping relationship, and then generate the DCI based on the obtained bit sequence value.

Figure 8:
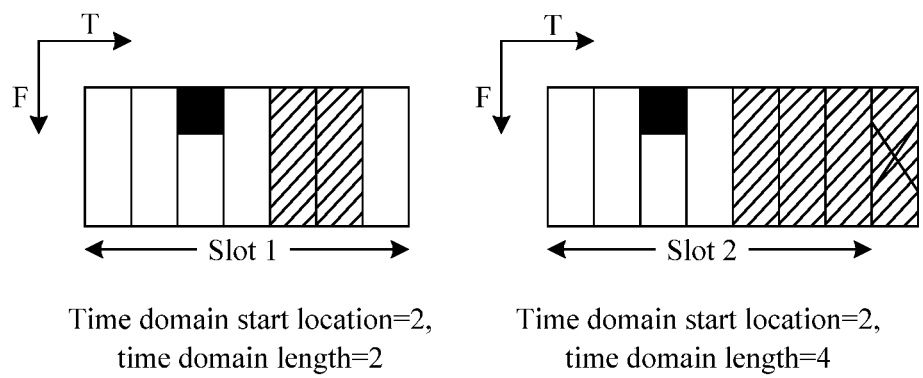
FIG. 8 is a schematic diagram of still yet another example of a mini-slot.

For example, after receiving the DCI sent by the network device, the terminal device may demodulate and decode the DCI, to obtain the time domain resource location information. Then, the terminal device looks up in Table 3 based on the time domain resource location information, to learn of the time domain start location and the time domain length for the data transmission. For example, the terminal device receives the DCI in the $3^{rd}$ time domain symbol, obtains a bit sequence value 01110 of the time domain resource location information through decoding, and obtains the time domain start location 2 and the time domain length 2 from Table 3 based on 01110. Herein, a description is provided with reference to FIG. 8. In a case shown in the left diagram of FIG. 8, the terminal device may learn, based on "the time domain start location 2 and the time domain length 2", that time domain symbols for transmitting data are a time domain symbol 5 and a time domain symbol 6 that are in a slot 1, and then receive the data in the time domain symbol 5 and the time domain symbol 6. For another example, the terminal device receives the DCI in the $3^{rd}$ time domain symbol, obtains a bit sequence value 10000 of the time domain resource location information through decoding, and obtains the time domain start location 2 and the time domain length 4 from Table 3 based on 10000. In a case shown in the right diagram of FIG. 8, the terminal device may learn, based on "the time domain start location 2 and the time domain length 4", that time domain symbols for transmitting data are a time domain symbol 5, a time domain symbol 6, a time domain symbol 7, and a time domain symbol 8 that are in a slot 2. However, cross-slot scheduling is not allowed for a mini-slot currently, that is, the time domain symbol 8 cannot be scheduled. In this case, the terminal device may consider that an error occurs in parsing of DCI at the moment, and discard the DCI. The terminal device does not receive downlink data or feed back information to the network device.

Therefore, the terminal device may determine, based on the time domain resource location information and the code mapping relationship, the time domain start location and the time domain length for the data transmission, thereby receiving the data.

It should be noted that the foregoing method 700 may also be used in combination with the aforesaid embodiment of "frequency domain resource location information." This is not limited.

The foregoing describes the control information transmission method according to the embodiments of this application. The following describes a terminal device and a network device according to the embodiments of this application.

Figure 9:
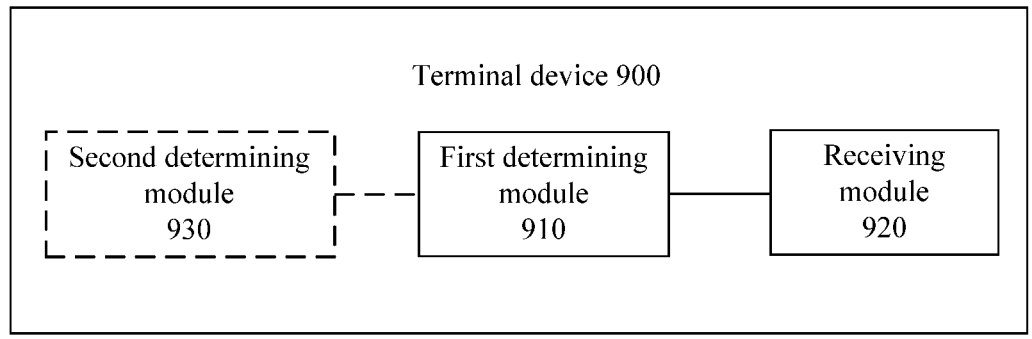
FIG. 9 is a schematic block diagram of a terminal device according to an embodiment of this application.

FIG. 9 is a schematic block diagram of a terminal device 900 according to an embodiment of this application. As shown in FIG. 9, the terminal device 900 includes: a first determining module 910, configured to determine a bit length of downlink control information DCI based on a location of a target first time unit in a second time unit, where the DCI includes time domain resource location information, the time domain resource location information is used to indicate at least one of time domain length information of a third time unit and time domain start location information for data transmission scheduled based on the DCI, the DCI is carried in the target first time unit, and a time domain length of the third time unit is less than or equal to a time domain length of the second time unit; and a receiving module 920, configured to receive the DCI from a network device.

Optionally, the time domain length information of the third time unit is used to indicate a quantity of first time units included in the third time unit.

Optionally, the first determining module 910 is specifically configured to: determine a bit length of the time domain resource location information in the DCI based on the location of the target first time unit in the second time unit and a first mapping relationship, where the first mapping relationship is used to indicate a correspondence between an index of the location of the target first time unit in the second time unit and the bit length of the time domain resource location information in the DCI; and determine the bit length of the DCI based on the bit length of the time domain resource location information in the DCI.

Optionally, the terminal device 900 further includes: a second determining module 930, configured to determine a bit length of frequency domain resource location information in the DCI based on the location of the target first time unit in the second time unit, where the frequency domain resource location information is used to indicate a location of a frequency domain resource used for the data transmission scheduled based on the DCI.

The first determining module 910 is specifically configured to: determine the bit length of the DCI based on the bit length of the frequency domain resource location information in the DCI.

Optionally, the second determining module 930 is specifically configured to: determine the bit length of the frequency domain resource location information in the DCI based on the location of the target first time unit in the second time unit and a second mapping relationship, where the second mapping relationship is used to indicate a correspondence between the index of the location of the target first time unit in the second time unit and the bit length of the frequency domain resource location information in the DCI.

The terminal device 900 according to this embodiment of this application may perform the terminal-device-side method in the control information transmission method 200 according to the embodiments of this application. The foregoing and other operations and/or functions of each module in the terminal device 900 are intended to implement corresponding procedures in the foregoing methods, and therefore beneficial effects of the method 200 can also be achieved. For brevity, details are not described herein.

Figure 10:
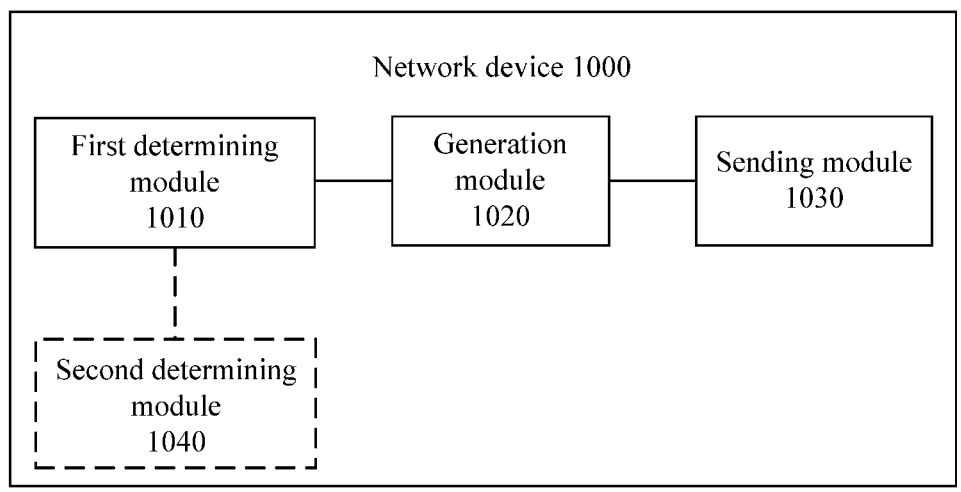
FIG. 10 is a schematic block diagram of a network device according to an embodiment of this application.

FIG. 10 is a schematic block diagram of a network device 1000 according to an embodiment of this application. As shown in FIG. 10, the network device 1000 includes: a first determining module 1010, configured to determine a bit length of downlink control information DCI based on a location of a target first time unit in a second time unit, where the DCI includes time domain resource location information, the time domain resource location information is used to indicate at least one of time domain length information of a third time unit and time domain start location information for data transmission scheduled based on the DCI, the DCI is carried in the target first time unit, and a time domain length of the third time unit is less than or equal to a time domain length of the second time unit; and a generation module 1020, configured to schedule a resource for data and generate the DCI; and a sending module 1030, configured to send the DCI in the target first time unit.

Optionally, the time domain length information of the third time unit is used to indicate a quantity of first time units included in the third time unit.

Optionally, the first determining module 1010 is specifically configured to: determine a bit length of the time domain resource location information in the DCI based on the location of the target first time unit in the second time unit and a first mapping relationship, where the first mapping relationship is used to indicate a correspondence between an index of the location of the target first time unit in the second time unit and the bit length of the time domain resource location information in the DCI; and determine the bit length of the DCI based on the bit length of the time domain resource location information in the DCI.

Optionally, the DCI further includes frequency domain resource location information, and the network device 1000 further includes: a second determining module 1040, configured to determine a bit length of the frequency domain resource location information in the DCI based on the location of the target first time unit in the second time unit, where the frequency domain resource location information is used to indicate a location of a frequency domain resource used for the data transmission scheduled based on the DCI.

Optionally, the second determining module 1040 is specifically configured to: determine the bit length of the frequency domain resource location information in the DCI based on the location of the target first time unit in the second time unit and a second mapping relationship, where the second mapping relationship is used to indicate a correspondence between the index of the location of the target first time unit in the second time unit and the bit length of the frequency domain resource location information in the DCI.

The network device 1000 according to this embodiment of this application may perform the network-device-side method in the control information transmission method 200 according to the embodiments of this application. The foregoing and other operations and/or functions of each module in the network device 1000 are intended to implement corresponding procedures in the foregoing methods, and therefore beneficial effects of the method 200 can also be achieved. For brevity, details are not described herein.

Figure 11:
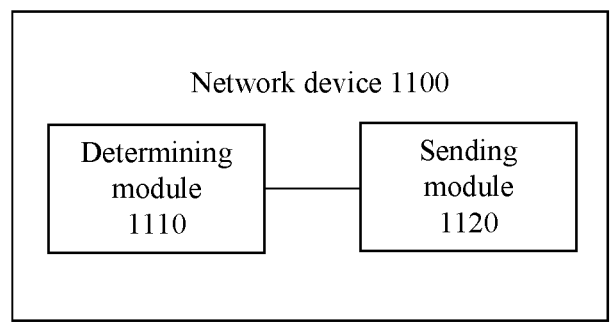
FIG. 11 is a schematic block diagram of a terminal device according to another embodiment of this application.

FIG. 11 is a schematic block diagram of a network device 1100 according to an embodiment of this application. As shown in FIG. 11, the network device 1100 includes: a determining module 1110, configured to determine a bit sequence value of time domain resource location information based on a time domain start location and a time domain length for data transmission, where the time domain resource location information is used to indicate a time domain resource for the data transmission; and a sending module 1120, configured to send downlink control information (DCI), where the DCI includes the time domain resource location information.

Optionally, the determining module 1110 is specifically configured to: determine the bit sequence value of the time domain resource location information based on a code mapping relationship, and the time domain start location and the time domain length for the data transmission, where the code mapping relationship is used to indicate a correspondence between the bit sequence value of the time domain resource location information and the time domain start location and the time domain length for the data transmission.

The network device 1100 according to this embodiment of this application may perform the network-device-side method in the control information transmission method 700 according to the embodiments of this application. The foregoing and other operations and/or functions of each module in the network device 1100 are intended to implement corresponding procedures in the foregoing methods, and therefore beneficial effects of the method 700 can also be achieved. For brevity, details are not described herein.

Figure 12:
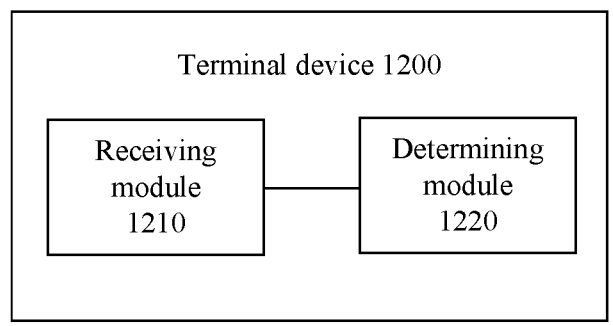
FIG. 12 is a schematic block diagram of a network device according to another embodiment of this application.

FIG. 12 is a schematic block diagram of a terminal device 1200 according to an embodiment of this application. As shown in FIG. 12, the terminal device 1200 includes: a receiving module 1210, configured to receive downlink control information DCI, where the DCI includes time domain resource location information, and the time domain resource location information is used to indicate a time domain resource for data transmission; and a determining module 1220, configured to obtain the time domain resource location information, and determine, based on the time domain resource location information, a time domain start location and a time domain length for the data transmission.

Optionally, the determining module 1220 is specifically configured to: determine, based on the time domain resource location information and a code mapping relationship, the time domain start location and the time domain length for the data transmission, where the code mapping relationship is used to indicate a correspondence between a bit sequence value of the time domain resource location information and the time domain start location and the time domain length for the data transmission.

The terminal device 1200 according to this embodiment of this application may perform the terminal-device-side method in the control information transmission method 700 according to the embodiments of this application. The foregoing and other operations and/or functions of each module in the terminal device 1200 are intended to implement corresponding procedures in the foregoing methods, and therefore beneficial effects of the method 700 can also be achieved. For brevity, details are not described herein.

Figure 13:
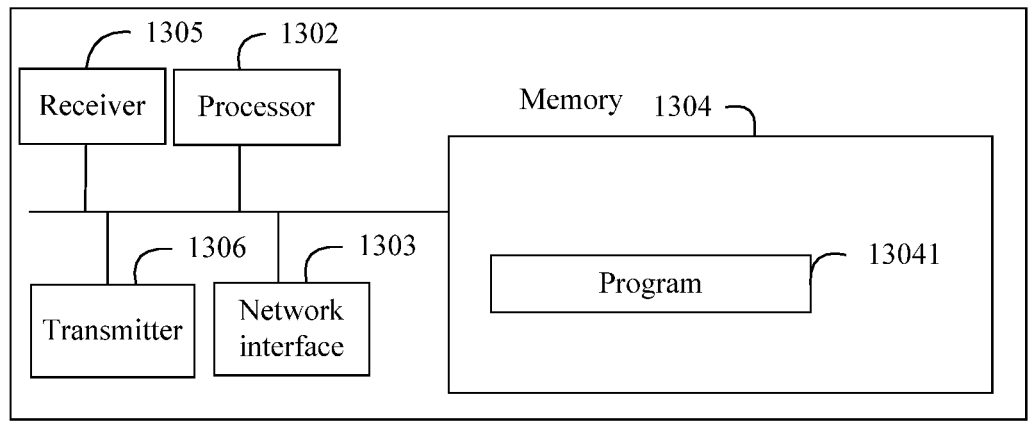
FIG. 13 is a structural block diagram of a terminal device according to an embodiment of this application.

FIG. 13 shows a structure of a terminal device according to an embodiment of this application. The structure of the terminal device includes at least one processor 1302 (for example, a CPU), at least one network interface 1303 or another communications interface, and a memory 1304. Optionally, a receiver 1305 and a transmitter 1306 may be further included. The processor 1302 is configured to execute an executable module, for example, a computer program, stored in the memory 1304. The memory 1304 may include a high speed random access memory RAM, or may further include a non-volatile memory, for example, at least one magnetic disk memory. The at least one network interface 1303 (which may be wired or wireless) is used to implement a communication connection to at least one other network element. The receiver 1305 and the transmitter 1306 are configured to receive and transmit various signals or information.

In some implementations, the memory 1304 stores a program 13041, and the program 13041 may be executed by the processor 1302, to perform the terminal-device-side method in the foregoing control information transmission method 200 in the embodiments of this application.

Figure 14:
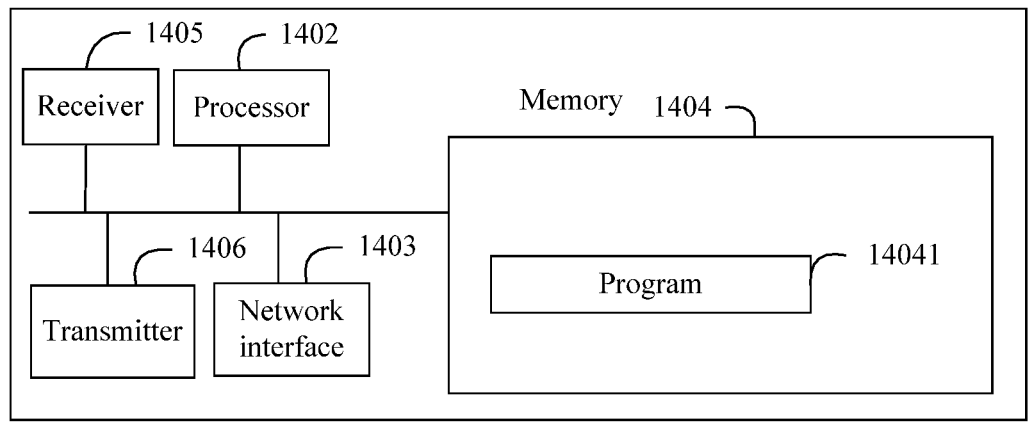
FIG. 14 is a structural block diagram of a network device according to an embodiment of this application.

FIG. 14 shows a structure of a network device according to an embodiment of this application. The structure of the network device includes at least one processor 1402 (for example, a CPU), at least one network interface 1403 or another communications interface, and a memory 1404. Optionally, a receiver 1405 and a transmitter 1406 may be further included. The processor 1402 is configured to execute an executable module, for example, a computer program, stored in the memory 1404. The memory 1404 may include a high speed random access memory RAM, or may further include a non-volatile memory, for example, at least one magnetic disk memory. The at least one network interface 1403 (which may be wired or wireless) is used to implement a communication connection to at least one other network element. The receiver 1405 and the transmitter 1406 are configured to receive and transmit various signals or information.

In some implementations, the memory 1404 stores a program 14041, and the program 14041 may be executed by the processor 1402, to perform the network-device-side method in the foregoing control information transmission method 200 in the embodiments of this application.

Figure 15:
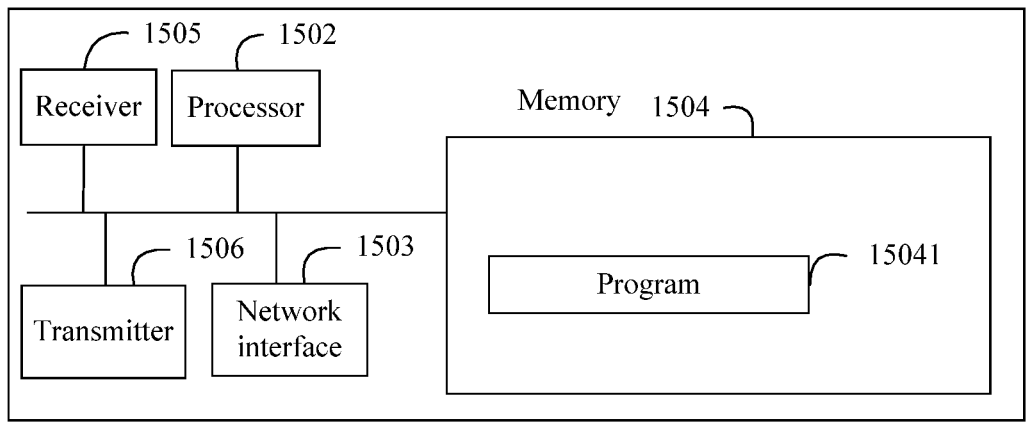
FIG. 15 is a structural block diagram of a network device according to another embodiment of this application.

FIG. 15 shows a structure of a network device according to an embodiment of this application. The structure of the network device includes at least one processor 1502 (for example, a CPU), at least one network interface 1503 or another communications interface, and a memory 1504. Optionally, a receiver 1505 and a transmitter 1506 may be further included. The processor 1502 is configured to execute an executable module, for example, a computer program, stored in the memory 1504. The memory 1504 may include a high speed random access memory RAM, or may further include a non-volatile memory, for example, at least one magnetic disk memory. The at least one network interface 1503 (which may be wired or wireless) is used to implement a communication connection to at least one other network element. The receiver 1505 and the transmitter 1506 are configured to receive and transmit various signals or information.

In some implementations, the memory 1504 stores a program 15041, and the program 15041 may be executed by the processor 1502, to perform the network-device-side method in the foregoing control information transmission method 700 in the embodiments of this application.

Figure 16:
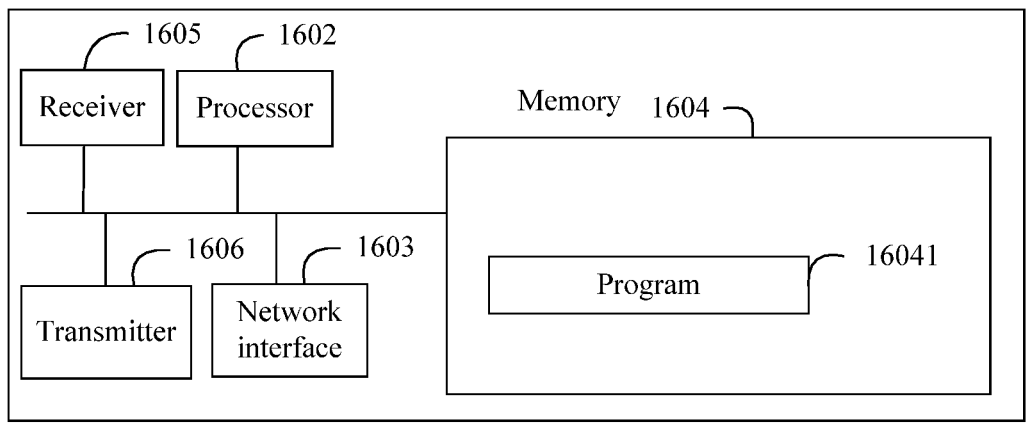
FIG. 16 is a structural block diagram of a terminal device according to another embodiment of this application.

FIG. 16 shows a structure of a terminal device according to an embodiment of this application. The structure of the terminal device includes at least one processor 1602 (for example, a CPU), at least one network interface 1603 or another communications interface, and a memory 1604. Optionally, a receiver 1605 and a transmitter 1606 may be further included. The processor 1602 is configured to execute an executable module, for example, a computer program, stored in the memory 1604. The memory 1604 may include a high speed random access memory RAM, or may further include a non-volatile memory, for example, at least one magnetic disk memory. The at least one network interface 1603 (which may be wired or wireless) is used to implement a communication connection to at least one other network element. The receiver 1605 and the transmitter 1606 are configured to receive and transmit various signals or information.

In some implementations, the memory 1604 stores a program 16041, and the program 16041 may be executed by the processor 1602, to perform the terminal-device-side method in the foregoing control information transmission method 700 in the embodiments of this application.

It may be understood that when the embodiments of this application are applied to a network device chip, the network device chip implements functions of the network device in the foregoing method embodiments. The network device chip sends the foregoing DCI and downlink data to another module (for example, a radio frequency module or an antenna) in the network device. The DCI is sent to the terminal device through the another module of the network device.

When the embodiments of this application are applied to a terminal device chip, the terminal device chip implements functions of the terminal device in the foregoing method embodiments. The terminal device chip receives the foregoing DCI and downlink data from another module (for example, a radio frequency module or an antenna) in the terminal device. The DCI and the downlink data are sent by the network device to the terminal device.

It should be understood that the term "and/or" in this specification describes only an association relationship between associated objects and represents that three relationships may exist. For example, A and/or B may represent three cases: Only A exists, both A and B exist, and only B exists. In addition, the character "/" in this specification generally indicates an "or" relationship between associated objects.

A person of ordinary skill in the art may be aware that with reference to examples of units and algorithm steps described in the embodiments disclosed in this specification, the embodiments can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

A person skilled in the art may clearly understand that, for ease and brevity of description, for specific working processes of the system, apparatus, and unit described above, reference may be made to corresponding processes in the foregoing method embodiments. Details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedures or the functions according to the embodiments of this application are all or partially generated. The computer may be a general-purpose computer, a special-purpose computer, a computer network, or another programmable apparatus. The computer instruction may be stored in a computer-readable medium or may be transmitted from one computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium, an optical medium, a semiconductor medium, or the like. The usable medium may be, for example, various media that can store program code, such as a floppy disk, a magnetic disk, a magnetic tape, a USB flash drive, a removable hard disk, a solid state disk (SSD), a read-only memory (ROM), a random access memory (RAM), a magnetic disc, or an optical disc.

In the several embodiments provided in this application, it should be understood that the disclosed system, apparatus, and method may be implemented in other manners. For example, the apparatus embodiment described above is merely an example. For example, the unit division is merely logical function division, and there may be another division manner in actual implementation. For example, a plurality of units or components may be combined or may be integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one location, or may be distributed on a plurality of network units. Some or all of the units may be selected depending on an actual requirement, to achieve the objectives of the solutions in the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in the embodiments of this application essentially, or the part contributing to the prior art, or some of the technical solutions may be implemented in a form of a software product. The computer software product is stored in a storage medium, and includes instructions used for enabling a computer device (which may be a personal computer, a server, a network device, or the like) to perform all or some of the steps in the methods described in the embodiments of this application.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A method, comprising:
   determining, by a terminal device, a bit length of downlink control information (DCI) based on a location of a target first time unit in a second time unit, wherein the DCI comprises time domain resource location information, the time domain resource location information indicates time domain length information of a third time unit or time domain start location information for data transmission scheduled based on the DCI, the DCI is carried in the target first time unit, and a time domain length of the third time unit is less than or equal to a time domain length of the second time unit; and
   receiving, by the terminal device, the DCI from a network device.

2. The method according to claim 1, wherein the time domain length information of the third time unit indicates a quantity of first time units comprised in the third time unit.

3. The method according to claim 1, wherein determining the bit length of the DCI based on the location of the target first time unit in the second time unit comprises:
   determining, by the terminal device, a bit length of the time domain resource location information in the DCI based on the location of the target first time unit in the second time unit and a first mapping relationship, wherein the first mapping relationship indicates a correspondence between an index of the location of the target first time unit in the second time unit and the bit length of the time domain resource location information in the DCI; and determining, by the terminal device, the bit length of the DCI based on the bit length of the time domain resource location information in the DCI.

4. The method according to claim 1, wherein:
the DCI further comprises frequency domain resource location information;
the method further comprises:
determining, by the terminal device, a bit length of the frequency domain resource location information in the DCI based on the location of the target first time unit in the second time unit, wherein the frequency domain resource location information indicates a location of a frequency domain resource used for the data transmission scheduled based on the DCI; and
determining the bit length of the DCI comprises:
determining, by the terminal device, the bit length of the DCI based on the bit length of the frequency domain resource location information in the DCI.

5. The method according to claim 4, wherein determining, by the terminal device, the bit length of the frequency domain resource location information in the DCI based on the location of the target first time unit in the second time unit comprises:
determining, by the terminal device, the bit length of the frequency domain resource location information in the DCI based on the location of the target first time unit in the second time unit and a second mapping relationship, wherein the second mapping relationship indicates a correspondence between an index of the location of the target first time unit in the second time unit and the bit length of the frequency domain resource location information in the DCI.

6. The method according to claim 1, wherein the time domain resource location information indicates the time domain length information of the third time unit.

7. The method according to claim 1, wherein the time domain resource location information indicates the time domain start location information for the data transmission scheduled based on the DCI.

8. An apparatus comprising:
a non-transitory memory storage comprising instructions; and
one or more processors in communication with the non-transitory memory storage, wherein the instructions are executable by the one or more processors, and the instructions comprise instructions to:
determine a bit length of downlink control information (DCI) based on a location of a target first time unit in a second time unit, wherein the DCI comprises time domain resource location information, the time domain resource location information indicates time domain length information of a third time unit or time domain start location information for data transmission scheduled based on the DCI, the DCI is carried in the target first time unit, and a time domain length of the third time unit is less than or equal to a time domain length of the second time unit; and
receive the DCI from a network device.

9. The apparatus according to claim 8, wherein the time domain length information of the third time unit indicates a quantity of first time units comprised in the third time unit.

10. The apparatus according to claim 8, wherein the instructions further comprise instructions to:
determine a bit length of the time domain resource location information in the DCI based on the location of the target first time unit in the second time unit and a first mapping relationship, wherein the first mapping relationship indicates a correspondence between an index of the location of the target first time unit in the second time unit and the bit length of the time domain resource location information in the DCI; and
determine the bit length of the DCI based on the bit length of the time domain resource location information in the DCI.

11. The apparatus according to claim 8, wherein the instructions further comprise instructions to:
determine a bit length of frequency domain resource location information in the DCI based on the location of the target first time unit in the second time unit, wherein the frequency domain resource location information indicates a location of a frequency domain resource used for the data transmission scheduled based on the DCI; and
determine the bit length of the DCI based on the bit length of the frequency domain resource location information in the DCI.

12. The apparatus according to claim 11, wherein the instructions further comprise instructions to:
determine the bit length of the frequency domain resource location information in the DCI based on the location of the target first time unit in the second time unit and a second mapping relationship, wherein the second mapping relationship indicates a correspondence between an index of the location of the target first time unit in the second time unit and the bit length of the frequency domain resource location information in the DCI.

13. The apparatus according to claim 8, wherein the time domain resource location information indicates the time domain length information of the third time unit.

14. The apparatus according to claim 8, wherein the time domain resource location information indicates the time domain start location information for the data transmission scheduled based on the DCI.

15. An apparatus comprising:
a non-transitory memory storage comprising instructions; and
one or more processors in communication with the non-transitory memory storage, wherein the instructions are executable by the one or more processors, and the instructions comprise instructions to:
determine a bit length of downlink control information (DCI) based on a location of a target first time unit in a second time unit, wherein the DCI comprises time domain resource location information, the time domain resource location information indicates time domain length information of a third time unit or time domain start location information for data transmission scheduled based on the DCI, the DCI is carried in the target first time unit, and a time domain length of the third time unit is less than or equal to a time domain length of the second time unit;
schedule a resource for the data transmission;
generate the DCI; and
send the DCI in the target first time unit.

16. The apparatus according to claim 15, wherein the time domain length information of the third time unit indicates a quantity of first time units comprised in the third time unit.

17. The apparatus according to claim 15, wherein the instructions further comprise instructions to:
- determine a bit length of the time domain resource location information in the DCI based on the location of the target first time unit in the second time unit and a first mapping relationship, wherein the first mapping relationship indicates a correspondence between an index of the location of the target first time unit in the second time unit and the bit length of the time domain resource location information in the DCI; and
- determine the bit length of the DCI based on the bit length of the time domain resource location information in the DCI.

18. The apparatus according to claim 15, wherein the instructions further comprise instructions to:
- determine a bit length of frequency domain resource location information in the DCI based on the location of the target first time unit in the second time unit, wherein the frequency domain resource location information indicates a location of a frequency domain resource used for the data transmission scheduled based on the DCI; and
- determine the bit length of the DCI based on the bit length of the frequency domain resource location information in the DCI.

19. The apparatus according to claim 18, wherein the instructions further comprise instructions to:
- determine the bit length of the frequency domain resource location information in the DCI based on the location of the target first time unit in the second time unit and a second mapping relationship, wherein the second mapping relationship indicates a correspondence between an index of the location of the target first time unit in the second time unit and the bit length of the frequency domain resource location information in the DCI.

20. The apparatus according to claim 15, wherein the time domain resource location information indicates the time domain length information of the third time unit.

* * * * *